United States Patent
Smith et al.

(10) Patent No.: US 10,961,448 B2
(45) Date of Patent: Mar. 30, 2021

(54) ACID STABILIZATION OF QUANTUM DOT-RESIN CONCENTRATES AND PREMIXES

(71) Applicant: Nanosys, Inc., Milpitas, CA (US)

(72) Inventors: Austin Smith, Redwood City, CA (US); Martin Devenney, Mountain View, CA (US); David Olmeijer, San Francisco, CA (US)

(73) Assignee: Nanosys, Inc., Milpitas, CA (US)

( * ) Notice: Subject to any disclaimer, the term of this patent is extended or adjusted under 35 U.S.C. 154(b) by 359 days.

(21) Appl. No.: 15/997,926

(22) Filed: Jun. 5, 2018

(65) Prior Publication Data

US 2018/0345638 A1    Dec. 6, 2018

Related U.S. Application Data

(60) Provisional application No. 62/515,339, filed on Jun. 5, 2017.

(51) Int. Cl.
| | | |
|---|---|---|
| C09K 11/08 | (2006.01) |
| C08L 35/02 | (2006.01) |
| C08L 33/14 | (2006.01) |
| C08F 2/46 | (2006.01) |
| C09K 11/02 | (2006.01) |
| C08L 71/08 | (2006.01) |

(Continued)

(52) U.S. Cl.
CPC ............... *C09K 11/08* (2013.01); *C08F 2/46* (2013.01); *C08L 33/14* (2013.01); *C08L 35/02* (2013.01); *C09K 11/025* (2013.01); *B82Y 30/00* (2013.01); *B82Y 40/00* (2013.01); *C08L 71/08* (2013.01); *C08L 2203/16* (2013.01); *C08L 2203/20* (2013.01)

(58) Field of Classification Search
CPC ....... C09K 11/08; C09K 11/025; B82Y 40/00; B82Y 30/00
See application file for complete search history.

(56) References Cited

U.S. PATENT DOCUMENTS

| 3,445,419 A | 5/1969 | Vanderlinde |
| 3,661,744 A | 5/1972 | Kehr et al. |

(Continued)

FOREIGN PATENT DOCUMENTS

| EP | 2878613 A1 | 6/2015 |
| WO | WO 2012/126695 A1 | 9/2012 |
| WO | WO 2016/081219 | * 5/2016 |

OTHER PUBLICATIONS

Battaglia, D. and Peng, X., "Formation of High Quality InP and InAs Nanocrystals in a Noncoordinating Solvent," *Nano Letters* 2(9):1027-1030, American Chemical Society, United States (2002).

(Continued)

*Primary Examiner* — C Melissa Koslow
(74) *Attorney, Agent, or Firm* — Sterne, Kessler, Goldstein & Fox P.L.L.C.

(57) ABSTRACT

The present invention provides nanostructure compositions and methods of producing nanostructure compositions. The nanostructure compositions comprise a population of nanostructures, a stabilization additive, and an organic resin. The present invention also provides nanostructure films comprising a nanostructure layer and methods of making nanostructure films.

31 Claims, 6 Drawing Sheets

(51) Int. Cl.
B82Y 40/00 (2011.01)
B82Y 30/00 (2011.01)

(56) References Cited

U.S. PATENT DOCUMENTS

| | | | |
|---|---|---|---|
| 4,119,617 | A | 10/1978 | Hanyuda et al. |
| 4,289,867 | A | 9/1981 | Martin et al. |
| 5,505,928 | A | 4/1996 | Alivisatos et al. |
| 6,207,229 | B1 | 3/2001 | Bawendi et al. |
| 6,225,198 | B1 | 5/2001 | Alivisatos |
| 6,306,736 | B1 | 10/2001 | Alivisatos |
| 6,322,901 | B1 | 11/2001 | Bawendi et al. |
| 6,413,697 | B1 | 7/2002 | Melisaris et al. |
| 6,576,291 | B2 | 6/2003 | Bawendi et al. |
| 6,607,829 | B1 | 8/2003 | Bawendi et al. |
| 6,788,453 | B2 | 9/2004 | Banin et al. |
| 6,821,337 | B2 | 11/2004 | Bawendi et al. |
| 6,861,155 | B2 | 3/2005 | Bawendi et al. |
| 6,949,206 | B2 | 9/2005 | Whiteford et al. |
| 7,060,243 | B2 | 6/2006 | Bawendi et al. |
| 7,125,605 | B2 | 10/2006 | Bawendi et al. |
| 7,138,098 | B2 | 11/2006 | Bawendi et al. |
| 7,267,875 | B2 | 9/2007 | Whiteford et al. |
| 7,374,807 | B2 | 5/2008 | Parce et al. |
| 7,374,824 | B2 | 5/2008 | Bawendi et al. |
| 7,557,028 | B1 | 7/2009 | Scher et al. |
| 7,566,476 | B2 | 7/2009 | Bawendi et al. |
| 7,572,393 | B2 | 8/2009 | Whiteford et al. |
| 7,645,397 | B2 | 1/2010 | Parce et al. |
| 8,062,967 | B1 | 11/2011 | Scher et al. |
| 8,101,234 | B2 | 1/2012 | Bawendi et al. |
| 8,158,193 | B2 | 4/2012 | Bawendi et al. |
| 8,282,412 | B1 | 10/2012 | Yaguchi et al. |
| 8,563,133 | B2 | 10/2013 | Whiteford et al. |
| 9,169,435 | B2 | 10/2015 | Guo et al. |
| 2008/0237540 | A1 | 10/2008 | Dubrow |
| 2008/0281010 | A1 | 11/2008 | Lefas et al. |
| 2010/0110728 | A1 | 5/2010 | Dubrow et al. |
| 2011/0262752 | A1 | 10/2011 | Bawendi et al. |
| 2011/0263062 | A1 | 10/2011 | Bawendi et al. |
| 2015/0203747 | A1 | 7/2015 | Haley et al. |
| 2015/0236195 | A1 | 8/2015 | Guo et al. |
| 2016/0005432 | A1* | 1/2016 | Hetzler ............ G11B 15/6835 360/91 |
| 2016/0005932 | A1 | 1/2016 | Lee et al. |
| 2017/0152437 | A1 | 6/2017 | Torres Cano et al. |

OTHER PUBLICATIONS

Borchert, H., et al., "Investigation of ZnS Passivated InP Nanocrystals by XPS," *Nano Letters* 2(2):151-154, American Chemical Society, United States (2002).

Chatani, S., et al., "Relative reactivity and selectivity of vinyl sulfones and acrylates towards the thiol-Michael addition reaction and polymerization," *Polym. Chem.* 4:1048-1055 (2013).

Cros-Gagneux, A., et al., "Surface Chemistry of InP Quantum Dots: A Comprehensive Study," *J. Am. Chem. Soc.* 132:18147-18157, American Chemical Society, United States (2010).

Guzelian, A.A., et al., "Colloidal chemical synthesis and characterization of InAs nanocrystal quantum dots,"*Appl. Phys. Lett.* 69(10):1432-1434, American Institute of Physics, United States (1996).

Guzelian, A.A., et al, "Synthesis of Size-Selected, Surface-Passivated InP Nanocrystals,"*J. Phys. Chem.* 100:7212-7219, American Chemical Society, United States (1996).

Haubold, S., et al., "Strongly Luminescent InP/ZnS Core-Shell Nanoparticles," *ChemPhysChem* 5:331-334, Wiley-VCH-Verlag GmbH, Germany (2001).

Hussain, S., et al, "One-Pot Fabrication of High-Quality InP/ZnS (Core/Shell) Quantum Dots and Their Application to Cellular Imaging," *ChemPhysChem* 10:1466-1470, Wiley-VCH Verlag GmbH, Germany (2009).

Kim, S., et al., "Highly Luminescent InP/GaP/ZnS Nanocrystals and Their Application to White Light-Emitting Diodes," *J. Am. Chem. Soc.* 134:3804-3809, American Chemical Society, United States (2012).

Li, L., et al. "Economic Synthesis of High Quality InP Nanocrystals Using Calcium Phosphide as the Phosphorus Precursor," *Chem. Mater.* 20:2621-2623, American Chemical Society, United States (2008).

Li, L. and Reiss, P., "One-pot Synthesis of Highly Luminescent InP/ZnS Nanocrystals without Precursor Injection," *J. Am. Chem. Soc.* 130:11588-11589, American Chemical Society, United States (2008).

Ligon, S.C., et al., "Advanced Applications of Thiol-Ene Formulations," Conference Paper (6 pages), RadTech Europe Conference 2013, Basel, Switzerland (2013).

Lim, J., et al., "InP@ZnSeS, Core@Composition Gradient Shell Quantum Dots with Enhanced Stability," *Chemistry of Materials* 23:4459-4463, American Chemical Society, United States (2011).

Liu, Z., et al.,"Coreduction Colloidal Synthesis of III-V Nanociystals: The Case of InP," *Angew. Chem. Int. Ed.* 47:3540-3542, Wiley-VCH Verlag GmbH & Co, Germany (2008).

Lucey, D.W., et al.,"Monodispersed InP Quantum Dots Prepared by Colloidal Chemistry in a Noncoordinating Solvent," *Chem. Mater.* 17:3754-3762, American Chemical Society, United States (2005).

Mićić, O. I., et al., "Core-Shell Quantum Dots of Lattice-Matched $ZnCdSe_2$ Shells on InP Cores: Experiment and Theory," *J. Phys. Chem. B* 104:12149-12156, American Chemical Society, United States (2000).

Mićić, O. I., et al., "Size-Dependent Spectroscopy of InP Quantum Dots," *J. Phys. Chem. B* 101:4904-4912, American Chemical Society, United States (1997).

Micic, O.I., et al.,"Synthesis and characterization of InP, GaP, and GaInP2 quantum dots," *J. Phys. Chem.* 99:7754-7759 (1995).

Nann, T., et al., "Water Splitting by Visible Light: A Nanophotocathode for Hydrogen Production," *Angew. Chem. Int. Ed.* 49:1574-1577, Wiley-VCH Verlag GmbH & Co., Germany (2010).

Price, S.C., et al., "Formation of Ultra-Thin Quantum Dot Films by Mist Deposition," *ESC Transactions* 11:89-94 (2007).

Wells, R.L., et al., "Use of Tris(trimethylsilyl)arsine to Prepare Gallium Arsenide and Indium Arsenide," *Chemistry of Materials* 1(1):4-6, American Chemical Society, United States (1989).

Xie, R., et al., "Colloidal InP Nanocrystals as Efficient Emitters Covering Blue to Near-Infrared," *J. Am. Chem. Soc.* 129:15432-15433, American Chemical Society, United States (2007).

Xu, S., et al., "Rapid Synthesis of High-Quality InP Nanocrystals," *J. Am. Chem. Soc.* 128:1054-1055, American Chemical Society, United States (2006).

Zan, F., et al., "Experimental Studies on Blinking Behavior of Single InP/ZnS Quantum Dots: Effects of Synthetic Conditions and UV Irradiation,"*J. Phys. Chem. C* 116:3944-3950, American Chemical Society, United States (2012).

Ziegler, J., et al., "Silica-Coated InP/ZnS Nanocrystals as Converter Material in White LEDs," *Adv. Mater* 20:4068-4073, Wiley-VCH Verlag GmbH & Co., Germany (2008).

International Search Report and Written Opinion for International Application No. PCT/US2018/035999, European Patent Office, Netherlands, dated Aug. 27, 2018, 18 pages.

* cited by examiner

ACID STABILIZATION OF QUANTUM DOT-RESIN CONCENTRATES AND PREMIXES

BACKGROUND OF THE INVENTION

Field of the Invention

The present invention provides nanostructure compositions and methods of producing nanostructure compositions. The nanostructure compositions comprise a population of nanostructures, a stabilization additive, and an organic resin. The present invention also provides nanostructure films comprising a nanostructure layer and methods of making nanostructure films.

Background of the Invention

There are several approaches used for quantum dot and/or nanoparticle delivery. Often, when quantum dots are manufactured for commercial purposes they are delivered as a colloidal suspension in an organic solvent such as toluene. However, delivering quantum dots in a solvent to end-users who wish to further process the quantum dots may be problematic for several reasons. First, quantum dots often require the presence of ligands on the quantum dot surfaces for maintaining the optical properties and structural integrity of the quantum dots. However, the ligands present on the quantum dot surfaces can diffuse in a solvent and, as such, the properties of quantum dots may change over time if stored in this way, whether the storage is at a manufacturing facility or an end-user facility. Second, end-users may prefer not to handle the solvents typically used for storage of quantum dots, such as toluene, due to the significant fire and health hazards and the general trend toward reducing volatile organic compounds in industrial settings. Third, the presence of even trace amounts of a carrier solvent may negatively impact the curing properties of a final quantum dot composite, for example, if the final matrix material is a polymer. Fourth, quantum dots stored in solvent may have a short shelf-life since the particles typically have a higher tendency to irreversibly agglomerate and therefore change properties over time. It is to be appreciated that, conventionally, quantum dots are shipped in solution (e.g., as suspended in an organic solvent or water) or as a powder.

Alternatively, quantum dots can also be mixed into a siloxane polymer. U.S. Patent Appl. No. 2015/0203747 describes a method for delivering quantum dots that are dispersed in a polymer bearing the same functional groups as standard light emitting diode (LED) polymer encapsulants, enabling elimination of the use of an organic solvent as a dispersant while ensuring compatibility between the carrier and LED polymers. Also described is a method in which quantum dots are delivered in one part of a two-part silicone formulation, again enabling the elimination of an organic solvent as a dispersant.

Quantum dots can be processed into a quantum dot enhancement film (QDEF) through formulation of the quantum dot nanocrystals with various optical resins which are then cured to provide a highly cross-linked optically active display component. Many quantum dots have ligands, such as amines, which can act as a base due to reversible binding to the nanocrystal surface or with excess or unbound ligand carried through to the formulation of the film.

Many optical resins of interest, such as acrylates, methacrylates, thiol-enes, and thiol-acrylates are vulnerable to uncontrollable polymerization and/or other side reactions in the presence of a base via base-catalyzed Michael addition or direct Michael addition. Thus, quantum dots which contain ligands that act as a base can only be added to resin systems vulnerable to base-catalyzed reactions immediately before processing into a film.

Resin solutions of interest for use in formulating QDEFs are currently shelf-stable at room temperature indefinitely as a formulation and quantum dots can only be added to these resin formulations if they do not cause a base-catalyzed reaction. In order to prepare a composition comprising quantum dots and resins that are susceptible to base-catalyzed reactions, there is a need for the prevention of interaction of excess or unbound ligands.

A need exists to prepare quantum dot solutions and/or resin mixes that have improved stability and result in improved optical properties when used to prepare a quantum dot film.

BRIEF SUMMARY OF THE INVENTION

The present invention provides a nanostructure composition, comprising:
(a) at least one population of nanostructures, wherein between about 20 and about 100 mole percent of ligands in at least one population of nanostructures comprise a ligand comprising an amine, a thiol, or a cyano functional group; and
(b) at least one organic resin, wherein at least one organic resin is an acrylate, a methacrylate, or a thiol-functional compound;
wherein the nanostructure composition is stable for at least 1 hour.

In some embodiments, the nanostructure composition comprises between one and five populations of nanostructures. In some embodiments, the nanostructure composition comprises two populations of nanostructures.

In some embodiments, at least one population of nanostructures in the nanostructure composition comprises a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the at least one population of nanostructures in the nanostructure composition comprises as a weight percentage between 0.0001% and 2% of the total weight of the nanostructure composition.

In some embodiments, the nanostructure composition comprises between one and five organic resins. In some embodiments, the nanostructure composition comprises two organic resins.

In some embodiments, the at least one organic resin in the nanostructure composition comprises as a weight percentage between 0.01% and 90% of the total weight of the nanostructure composition.

In some embodiments, at least one organic resin in the nanostructure composition is a thermosetting resin or a UV curable resin. In some embodiments, at least one organic resin in the nanostructure composition is a UV curable resin.

In some embodiments, at least one organic resin in the nanostructure composition is a thiol-functional compound.

In some embodiments, at least one organic resin in the nanostructure composition is an acrylate.

In some embodiments, at least two organic resins in the nanostructure composition are acrylates.

In some embodiments, at least one organic resin in the nanostructure composition is selected from the group consisting of pentaerythritol tetrakis(3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

In some embodiments, at least one organic resin in the nanostructure composition is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, at least one organic resin in the nansotructure composition is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxycyclohexyl)propane diacrylate, and bis(4-hydroxycyclohexyl)methane diacrylate.

In some embodiments, the nanostructure composition comprises two organic resins, wherein one organic resin is pentaerythritol tetrakis(3-mercaptopropionate) and one organic resin is tricyclodecane dimethanol diacrylate.

In some embodiments, the nanostructure composition further comprises a thermal initiator or a photoinitiator.

In some embodiments, the nanostructure composition further comprises a photoinitiator, wherein the photoinitiator is ethyl-(2,4,6-trimethylbenzoyl)phenyl phosphinate.

In some embodiments, the at least one organic resin in the nanostructure composition comprises as a weight percentage between 15% and 80% of the total weight of the nansostructure composition.

In some embodiments, the nanostructure composition is stable for at least 24 hours.

In some embodiments, the nanostructure composition comprises two populations of nanostructures and three organic resins, wherein two organic resins are acrylates and one organic resin is a thiol-functional compound.

In some embodiments, a molded article comprises the nanostructure composition. In some embodiments, the molded article is a film, a substrate for a display, or a light emitting diode. In some embodiments, the molded article is a film.

The present invention provides a method of preparing a nanostructure composition, the method comprising:
(a) providing a composition comprising at least one population of nanostructures and at least one stabilization additive, wherein between about 20 and about 100 mole percent of ligands in at least one population of nanostructures comprise a ligand comprising an amine, a thiol, or a cyano functional group; and
(b) admixing at least one organic resin with the composition of (a), wherein at least one organic resin comprises an acrylate, a methacrylate, or a thiol-functional compound.

In some embodiments, the composition comprises two populations of nanostructures.

In some embodiments, the comprises at least one population of nanostructures containing a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the composition comprises at least one population of nanostructures comprising as a weight percentage between 0.0001% and 2% of the total weight of the nanostructure composition.

In some embodiments, the method comprises providing between one and five stabilization additives.

In some embodiments, the nanostructure composition has a viscosity increase of less than 40% at 1 hour after the admixing in (b).

In some embodiments, the at least one stabilization additive comprises as a weight percentage between 0.05% and 10% of the total weight of the nanostructure composition.

In some embodiments, the at least one stabilization additive is an organic acid or an ionic liquid.

In some embodiments, the at least one stabilization additive is selected from the group consisting of a carboxylic acid, a phosphinic acid, a phosphonic acid, a phosphate ester, a sulfinic acid, and a sulfonic acid.

In some embodiments, the at least one stabilization additive is selected from the group consisting of itaconic acid, diphenylphosphinic acid, diisooctylphosphinic acid, bis(methacryloxyethyl)phosphate, and deceth-4 phosphate.

In some embodiments, the at least one stabilization additive is diphenylphosphinic acid or bis(methacryloxyethyl) phosphate.

In some embodiments, the nanostructure composition has a viscosity increase of less than 40% at 24 hours after the admixing in (b).

In some embodiments, the method comprises admixing two organic resins with the composition of (a).

In some embodiments, the at least one organic resin is a thermosetting resin or a UV curable resin. In some embodiments, the at least one organic resin is a UV curable resin.

In some embodiments, at least one organic resin is a thiol-functional compound.

In some embodiments, the at least one organic resin is selected from the group consisting of pentaerythritol tetrakis(3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

In some embodiments, the at least one organic resin is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, the at least one organic resin is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxycyclohexyl)propane diacrylate, and bis(4-hydroxycyclohexyl)methane diacrylate.

In some embodiments, one organic resin is pentaerythritol tetrakis(3-mercaptopropionate) and one organic resin is tricyclodecane dimethanol diacrylate.

In some embodiments, the at least one organic resin comprises as a weight percentage between 5% and 90% of the total weight of the nanostructure composition.

In some embodiments, the nanostructure composition has a viscosity increase of less than 20% at 1 hour after the admixing in (b).

In some embodiments, the composition comprises two populations of nanostructures, three organic resins, and one stabilization additive.

The present invention also provides a method of preparing a nanostructure composition comprising:
(a) providing a composition comprising at least one organic resin and at least one stabilization additive, wherein at least one organic resin comprises an acrylate, a methacrylate, or a thiol-functional compound; and
(b) admixing at least one population of nanostructures with the composition of (a), wherein between about 20 and about 100 mole percent of ligands in at least one population of nanostructures comprise a ligand comprising an amine, a thiol, or a cyano functional group.

In some embodiments, the composition comprises two populations of nanostructures.

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the at least one population of nanostructures as a weight percentage between 0.0001% and 2% of the total weight of the nanostructure composition.

In some embodiments, the composition comprises between one and five stabilization additives.

In some embodiments, the composition comprises one stabilization additive.

In some embodiments, the at least one stabilization additive comprises as a weight percentage between 0.05% and 10% of the total weight of the nanostructure composition.

In some embodiments, the at least one stabilization additive is an organic acid or an ionic liquid.

In some embodiments, the at least one stabilization additive is selected from the group consisting of a carboxylic acid, a phosphinic acid, a phosphonic acid, a phosphate ester, a sulfinic acid, and a sulfonic acid.

In some embodiments, the at least one stabilization additive is selected from the group consisting of itaconic acid, diphenylphosphinic acid, diisooctylphosphinic acid, bis (methacryloxyethyl)phosphate, and deceth-4 phosphate.

In some embodiments, the at least one stabilization additive is diphenylphosphinic acid or bis(methacryloxyethyl) phosphate.

In some embodiments, the composition has a viscosity increase of less than 40% at 1 hour after the admixing in (b).

In some embodiments, the composition comprises two organic resins.

In some embodiments, the at least one organic resin is a thermosetting resin or a UV curable resin.

In some embodiments, the at least one organic resin is a UV curable resin.

In some embodiments, at least one organic resin is a thiol-functional compound.

In some embodiments, the at least one organic resin is selected from the group consisting of pentaerythritol tetrakis (3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

In some embodiments, the at least one organic resin is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, at least one organic resin is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxycyclohexyl)propane diacrylate, and bis(4-hydroxycyclohexyl)methane diacrylate.

In some embodiments, the composition comprises two organic resins, wherein one organic resin is pentaerythritol tetrakis(3-mercaptopropionate) and one organic resin is tricyclodecane dimethanol diacrylate.

In some embodiments, the at least one organic resin comprises as a weight percentage between 5% and 90% of the total weight of the nanostructure composition.

In some embodiments, the nanostructure composition has a viscosity increase of less than 40% at 24 hours after the admixing in (b).

The present invention also provides a method of preparing a nanostructure composition comprising:
(a) providing a composition comprising at least one population of nanostructures and at least one organic resin, wherein between about 20 and about 100 mole percent of ligands in at least one population of nanostructures comprise a ligand comprising an amine, a thiol, or a cyano functional group, and wherein at least one organic resin comprises an acrylate, a methacrylate, or a thiol-functional compound; and
(b) admixing at least one stabilization additive with the composition of (a).

In some embodiments, the composition comprises two populations of nanostructures.

In some embodiments, the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the at least one population of nanostructures comprises as a weight percentage between 0.0001% and 2% of the total weight of the nanostructure composition.

In some embodiments, the composition comprises between one and five stabilization additives.

In some embodiments, the composition comprises one stabilization additive.

In some embodiments, the at least one stabilization additive comprises as a weight percentage between 0.05% and 10% of the total weight of the nanostructure composition.

In some embodiments, the at least one stabilization additive is an organic acid or an ionic liquid.

In some embodiments, the at least one stabilization additive is selected from the group consisting of a carboxylic acid, a phosphinic acid, a phosphonic acid, a phosphate ester, a sulfinic acid, and a sulfonic acid.

In some embodiments, the at least one stabilization additive is selected from the group consisting of itaconic acid, diphenylphosphinic acid, diisooctylphosphinic acid, bis(methacryloxyethyl)phosphate, and deceth-4 phosphate.

In some embodiments, the at least one stabilization additive is diphenylphosphinic acid or bis(methacryloxyethyl) phosphate.

In some embodiments, the nanostructure composition has a viscosity increase of less than 40% at 1 hour after the admixing in (b).

In some embodiments, the composition comprises two organic resins.

In some embodiments, the at least one organic resin is a thermosetting resin or a UV curable resin.

In some embodiments, the at least one organic resin is a UV curable resin.

In some embodiments, at least one organic resin is a thiol-functional compound.

In some embodiments, the at least one organic resin is selected from the group consisting of pentaerythritol tetrakis (3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

In some embodiments, at least one organic resin is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, at least one organic resin is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxycyclohexyl)propane diacrylate, and bis(4-hydroxycyclohexyl)methane diacrylate.

In some embodiments, the composition comprises two organic resins, wherein one organic resin is pentaerythritol tetrakis(3-mercaptopropionate) and one organic resin is tricyclodecane dimethanol diacrylate.

In some embodiments, the at least one organic resin comprises as a weight percentage between 5% and 90% of the total weight of the nanostructure composition.

In some embodiments, the nanostructure composition has a viscosity increase of less than 40% at 24 hours after the admixing in (b).

The present invention also provides a nanostructure film layer comprising:
(a) at least one population of nanostructures, wherein between about 20 and about 100 mole percent of ligands in at least one population of nanostructures comprise a ligand comprising an amine, a thiol, or a cyano functional group; and
(b) at least one organic resin, wherein at least one organic resin is an acrylate, a methacrylate, or a thiol-functional compound;

wherein the nanostructure film layer is stable for at least 1 hour.

In some embodiments, the nanostructure film layer comprises between one and five populations of nanostructures.

In some embodiments, the nanostructure film layer comprises two populations of nanostructures.

In some embodiments, the at least one population of nanostructures comprises a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the at least one population of nanostructures comprises as a weight percentage between 0.0001% and 2% of the total weight of the nanostructure composition.

In some embodiments, the nanostructure film layer comprises between one and five organic resins.

In some embodiments, the nanostructure film layer comprises two organic resins.

In some embodiments, the at least one organic resin comprises as a weight percentage between 0.01% and 90% of the total weight of the nanostructure film layer.

In some embodiments, the at least one organic resin is a thermosetting resin or a UV curable resin.

In some embodiments, the at least one organic resin is a UV curable resin.

In some embodiments, at least one organic resin is a thiol-functional compound.

In some embodiments, at least one organic resin is an acrylate.

In some embodiments, at least two organic resins are acrylates.

In some embodiments, at least one organic resin is selected from the group consisting of pentaerythritol tetrakis (3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

In some embodiments, at least one organic resin is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, at least one organic resin is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxycyclohexyl)propane diacrylate, and bis(4-hydroxycyclohexyl)methane diacrylate.

In some embodiments, the nanostructure film layer comprises two organic resins, wherein one organic resin is pentaerythritol tetrakis(3-mercaptopropionate) and one organic resin is tricyclodecane dimethanol diacrylate.

In some embodiments, the nanostructure film layer further comprises a thermal initiator or a photoinitiator.

In some embodiments, the nanostructure film layer further comprises a photoinitiator, wherein the photoinitiator is ethyl-(2,4,6-trimethylbenzoyl)phenyl phosphinate.

In some embodiments, the at least one organic resin comprises as a weight percentage between 15% and 90% of the total weight of the nanostructure film layer.

In some embodiments, the nanostructure film layer is stable for at least 24 hours.

In some embodiments, the nanostructure film layer comprises two populations of nanostructure and three organic resins, wherein two organic resins are acrylates and one organic resin is a thiol-functional compound.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
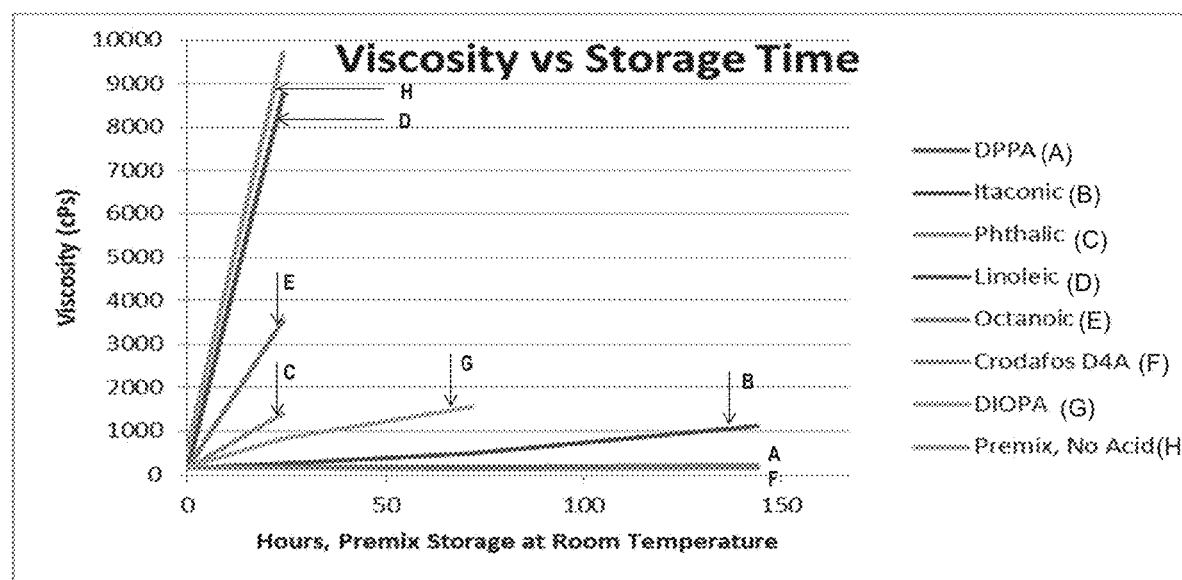
FIG. 1 is a graph showing viscosity versus storage time for (A) premix with 1% (w/w) of diphenylphosphinic acid (DPPA); (B) premix with 1% (w/w) itaconic acid; (C) premix with 1% (w/w) phthalic acid; (D) premix with 1% (w/w) linoleic acid; (E) premix with 1% (w/w) octanoic acid; (F) premix with 1% (w/w) Deceth-4 phosphate (Crodafos™ D4A); (G) premix with 1% (w/w) diisooctylphosphinic acid (DIOPA); and (H) premix with no acid (control).

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an," and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. In some embodiments, the solubilizing group is a long-chain alkyl, a long-chain heteroalkyl, a long-chain alkenyl, a long-chain alkynyl, a cycloalkyl, or an aryl.

As used herein, the term "stable" refers to a mixture or composition that resists change or decomposition due to internal reaction or due to the action of air, heat, light, pressure, or other natural conditions.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "functional group equivalent weight" (FGEW) is used to determine the ratio of the reactive functional groups in a polymer. The FGEW of a polymer is defined as the ratio of the number average molecular weight (NAMW) to the number of functional groups in the polymer (n). It is the weight of a polymer that contains one formula weight of the functional group. The FGEW can be calculated using end-group analysis by counting the number of reactive functional groups and dividing into the number average molecular weight:

$FGEW = NAMW/n$ where n=the number of reactive functional groups in the monomer.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

"Alkenyl" as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula ($-NR^K_2$), wherein $R^K$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contain one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds of the present invention are nitrogen, oxygen, and sulfur. Representative heterocycloalkyl moieties include, for example, morpholino, piperazinyl, piperidinyl, and the like.

The term "alkylene," as used herein, alone or in combination, refers to a saturated aliphatic group derived from a straight or branched chain saturated hydrocarbon attached at two or more positions, such as methylene (—$CH_2$—). Unless otherwise specified, the term "alkyl" may include "alkylene" groups.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazinyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

"Carboxylic acid" as used herein refers to a compound that contains a carboxyl group and has the general formula R—COOH, wherein R is an alkyl, an optionally substituted alkyl, an aryl, an optionally substituted aryl, a heteroaryl, or an optionally substituted heteroaryl.

"Nitrile" as used herein is any organic compound that has a —C≡T functional group. The term cyano is used interchangeably with the term nitrile.

"Phosphonic acid" as used herein refers to a compound of the general formula R—PO(OH)$_2$, wherein R is an alkyl, an optionally substituted alkyl, an aryl, an optionally substituted aryl, a heteroaryl, or an optionally substituted heteroaryl.

"Phosphinic acid" as used herein refers to a compound of the general formula R—PO(OH)H, wherein R is an alkyl, an optionally substituted alkyl, an aryl, an optionally substituted aryl, a heteroaryl, or an optionally substituted heteroaryl.

"Sulfonic acid" as used herein refers to a compound with the general formula R—S(O)$_2$—OH, wherein R is an alkyl, an optionally substituted alkyl, an aryl, an optionally substituted aryl, a heteroaryl, or an optionally substituted heteroaryl.

"Sulfinic acid" as used herein refers to a compound with the general formula R—S(O)—OH, wherein R is an alkyl, an optionally substituted alkyl, an aryl, an optionally substituted aryl, a heteroaryl, or an optionally substituted heteroaryl.

Unless clearly indicated otherwise, ranges listed herein are inclusive.

A variety of additional terms are defined or otherwise characterized herein.

Nanostructure Composition

In some embodiments, the present invention provides a nanostructure composition comprising:
(a) at least one population of nanostructures, wherein between about 20 and about 100 mole percent of ligands in at least one population of nanostructures comprise a ligand comprising an amine, a thiol, or a cyano functional group; and
(b) at least one organic resin, wherein at least one organic resin is an acrylate, a methacrylate, or a thiol-functional compound;
wherein the nanostructure composition is stable for at least 24 hours.

In some embodiments, the present invention provides a nanostructure film kit comprising:
(a) a first composition comprising at least one population of nanostructures and at least one stabilization additive, wherein between about 20 and about 100 mole percent of ligands in at least one population of nanostructures comprise a ligand comprising an amine, a thiol, or a cyano functional group;
(b) a second composition comprising at least one organic resin, wherein at least one organic resin is a acrylate, a methacrylate, or a thiol-functional compound; and
(c) instructions for preparing a nanostructure film.

In some embodiments, the nanostructure film kit further comprises a solvent.

In some embodiments, the nanostructure is a quantum dot.

In some embodiments, the present invention provides a nanostructure film kit comprising:
(a) a composition comprising at least one population of nanostructures, at least one stabilization additive, and at least one organic resin, wherein between about 20 and about 100 mole percent of ligands in at least one population of nanostructures comprise a ligand comprising an amine, a thiol, or a cyano functional group, and wherein at least one organic resin is a acrylate, a methacrylate, or a thiol-functional compound; and
(b) instructions for preparing a nanostructure film.

In some embodiments, the nanostructure film kit further comprises a solvent.

In some embodiments, the nanostructure is a quantum dot.

Nanostructure Film Layer

In some embodiments, the present invention provides a nanostructure film layer comprising:
(a) at least one population of nanostructures, wherein between about 20 and about 100 mole percent of ligands in at least one population of nanostructures comprise a ligand comprising an amine, a thiol, or a cyano functional group; and
(b) at least one organic resin, wherein at least one organic resin is an acrylate, methacrylate, or a thiol-functional compound;
wherein the nanostructure film layer is stable for at least 24 hours.

In some embodiments, the nanostructure is a quantum dot.

Nanostructure Molded Article

In some embodiments, the present invention provides a nanostructure molded article comprising:
(a) at least one population of nanostructures, wherein between about 20 and about 100 mole percent of ligands in at least one population of nanostructures comprise a ligand comprising an amine, a thiol, or a cyano functional group; and
(b) at least one organic resin, wherein at least one organic resin is an acrylate, methacrylate, or a thiol-functional compound.

In some embodiments, the molded article is a film, a substrate for a display, or a light emitting diode.

In some embodiments, the nanostructure is a quantum dot.

Nanostructure Barrier Layer

In some embodiments, the present invention provides a nanostructure film comprising:
(a) a first barrier layer;
(b) a second barrier layer; and
(c) a nanostructure layer between the first barrier layer and the second barrier layer, wherein the nanostructure layer comprises at least one population of nanostructures, wherein between about 20 and about 100 mole percent of ligands in at least one population of nanostructures comprise a ligand comprising an amine, a thiol, or a cyano functional group; and at least one organic resin, wherein at least one organic resin is an acrylate, a methacrylate, or a thiol-functional compound;
wherein the nanostructure film is stable for at least 24 hours.

In some embodiments, the nanostructure is a quantum dot.

Nanostructures

The nanostructures for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, and CdS.

Although Group II-VI nanostructures such as CdSe and CdS nanostructures can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present invention is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is a InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/0236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched $ZnCdSe_2$ shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and $GaInP_2$ quantum dots," *J. Phys. Chem.* 99:7754-7759 (1995); Guzelian, A. A., et al., "Synthesis of size-selected, surface-passivated InP nanocrystals," *J. Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, $CuInS_2$, $CuInSe_2$, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient nanostructures with quantum yields close to unity and thin shell coatings.

In some embodiments, the nanostructures of the present invention include a core and at least one shell. In some embodiments, the nanostructures of the present invention include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, Pb Se, PbTe, CuF, CuCl, CuBr, CuI, $Si_3N_4$, $Ge_3N_4$, $Al_2O_3$, $Al_2CO_3$ and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium.

In some embodiments, the core/shell luminescent nanocrystals (represented as core/shell) are CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

The luminescent nanocrystals can be made from a material impervious to oxygen, thereby simplifying oxygen barrier requirements and photostabilization of the nanostructures in the nanostructure film layer. In exemplary embodiments, the luminescent nanocrystals are coated with one or more organic polymeric ligand material and dispersed in an organic polymeric matrix comprising one or more matrix materials. The luminescent nanocrystals can be further coated with one or more inorganic layers comprising one or more material such as a silicon oxide, an aluminum oxide, or a titanium oxide (e.g., $SiO_2$, $Si_2O_3$, $TiO_2$, or $Al_2O_3$), to hermetically seal the nanostructures.

In some embodiments, the population of nanostructures emits red, green, or blue light. In some embodiments, the respective portions of red, green, and blue light can be controlled to achieve a desired white point for the white light emitted by a display device incorporating a nanostructure film. In some embodiments, the nanostructure composition comprises at least one population of nanostructure material.

In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 nanostructure materials. Any suitable ratio of the populations of nanostructures can be combined to create the desired nanostructure composition characteristics.

In some embodiments, the weight percentage of the population of nanostructures in the nanostructure composition is between about 0.001% and about 2%, about 0.001% and about 1%, about 0.001% and about 0.5%, about 0.001% and about 0.1%, about 0.001% and 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%.

In some embodiments, the weight percent of the population of nanostructures in the nanostructure molded article is between about 0.001% and about 2%, about 0.001% and about 1%, about 0.001% and about 0.5%, about 0.001% and about 0.1%, about 0.001% and about 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%.

In some embodiments, the nanostructure is a quantum dot.

In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 quantum dot materials. Any suitable ratio of the populations of quantum dots can be combined to create the desired nanostructure composition characteristics.

In some embodiments, the weight percentage of the population of quantum dots in the nanostructure composition is between about 0.001% and about 2%, about 0.001% and about 1%, about 0.001% and about 0.5%, about 0.001% and about 0.1%, about 0.001% and 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%.

In some embodiments, the weight percent of the population of quantum dots in the nanostructure molded article is between about 0.001% and about 2%, about 0.001% and about 1%, about 0.001% and about 0.5%, about 0.001% and about 0.1%, about 0.001% and about 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%.

Ligands

In some embodiments, the nanostructures comprise ligands conjugated to their surface. In some embodiments, the nanostructures include a coating layer comprising ligands to protect the nanostructures from external moisture and oxidation, to control aggregation, and to allow for dispersion of the nanostructures in a matrix material. Suitable ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728.

In some embodiments, the nanostructures comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the ligands comprise one or more organic polymeric ligands. In some embodiments, the ligands provide the following: efficient and strong bonding nanostructure encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the ligand comprises a soft nucleophilic functional group. Soft nucleophiles favor an orbital interaction over charge, are less reactive, and allow for the formation of a thermodynamically stable product to be formed. In the case of a 2,3-unsaturated ketone, the product of a Michael addition (1,4-addition) with a soft nucleophile is more stable than the product of an attack on the carbonyl (1,2-addition); thus, the reaction is controlled by the thermodynamics of the possible product, not the kinetics of the possible attack. In some embodiments, the soft nucleophilic functional group is an amine, a thiol, or a cyano functional group. In some embodiments, the amine is a primary amine or a secondary amine.

In some embodiments, the population of nanostructures comprise ligands comprising an amine, a thiol, a cyano, or combinations thereof. In some embodiments, the population of nanostructures comprise ligands comprising an amine functional group. In some embodiments, the population of nanostructures comprise ligands comprising a thiol functional group. In some embodiments, the population of nanostructures comprise ligands comprising a cyano functional group.

In some embodiments, between about 20 and about 100 mole percent of ligands in at least one population of nanostructures comprise a ligand comprising an amine, a thiol, or a cyano functional group. In some embodiments, between about 20 and about 100 mole percent, about 20 and about 90 mole percent, about 20 and about 80 mole percent, about 20 and about 60 mole percent, about 20 and about 40 mole percent, about 40 and about 100 mole percent, about 40 and about 90 mole percent, about 40 and about 80 mole percent, about 40 and about 60 mole percent, about 60 and about 100 mole percent, about 60 and about 90 mole percent, about 60 and about 80 mole percent, about 80 and about 100 mole percent, about 80 and about 90 mole percent, or about 90 and about 100 mole percent of ligands in at least one population of nanostructures comprise a ligand comprising an amine, a thiol, or a cyano functional group.

Solvents

In some embodiments, the nanostructure composition further comprises a solvent. In some embodiments, the solvent is selected from the group consisting of chloroform, acetone, butanone, ethylene glycol monoethyl ether, ethylene glycol monopropyl ether, ethylene glycol monobutyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

Solvent Exchange

Methods of preparing nanostructures typically involve the use of a solvent. In some embodiments, the solvent is not removed after preparation of a population of nanostructures. In some embodiments, the population of nanostructures are stored in a solvent.

In some embodiments, the solvent is exchanged for an organic resin. In some embodiments, the population of nanostructures added to the nanostructure composition does not comprise a solvent.

In some embodiments, the solvent is exchanged for an organic resin which is an acrylate. In some embodiments the solvent is exchanged for an organic resin selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

In some embodiments, the solvent is exchanged for an organic resin by distillation. In some embodiments, the solvent is exchanged for an organic resin by distillation at a temperature between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the solvent is exchanged for an organic resin by distillation at a temperature between about 23° C. and 100° C.

Organic Resin

In some embodiments, the organic resin is a thermosetting resin or a ultraviolet (UV) curable resin. In some embodiments, the organic resin is cured with a method that facilitates roll-to-roll processing.

In some embodiments, the composition comprises at least one organic resin. In some embodiments, the composition comprises at least two organic resins. In some embodiments, the composition comprises between 1 and 6, 1 and 5, 1 and 4, 1 and 3, 1 and 2, 2 and 6, 2 and 5, 2 and 4, 2 and 3, 3 and 6, 3 and 5, 3 and 4, 4 and 6, 4 and 5, or 5 and 6 organic resins. In some embodiments, the composition comprises 1 organic resin. In some embodiments, the composition comprises 2 organic resins. In some embodiments, the composition comprises 3 organic resins.

In some embodiments, at least one organic resin is an acrylate, a methacrylate, or a thiol-functional compound.

In some embodiments, at least one organic resin is an acrylate. In some embodiments, at least one organic resin is a methacrylate. In some embodiments, at least one organic resin is a thiol-functional compound.

In some embodiments, the organic resin is an acrylate. In some embodiments, the organic resin is a single acrylate compound or a mixture of different acrylate compounds. In some embodiments, the organic resin is an acrylate of mono-functional, di-functional, or of a higher functionality.

In some embodiments, the organic resin is a monofunctional acrylate. In some embodiments, the organic resin is isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, or glycidyl acrylate.

In some embodiments, the organic resin is a di-functional acrylate. In some embodiments, the organic resin is tricyclodecane dimethanol diacrylate (SARTOMER® 833s), dioxane glycerol diacrylate (SARTOMER® CD 536), 1,6-hexanediol diacrylate (SARTOMER® 238), 3-methyl 1,5-pentanediol diacrylate (SARTOMER® 341), tripropylene glycol diacrylate (SARTOMER® 306), neopentyl glycol diacrylate (SARTOMER® 247), dimethyloltricyclodecane diacrylate (KAYARAD® R-684), 1,4-dihydroxymethylcyclohexane diacrylate, 2,2-bis(4-hydroxycyclohexyl)propane diacrylate, or bis(4-hydroxycyclohexyl)methane diacrylate.

In some embodiments, the organic resin is an acyclic aliphatic di-functional acrylate. In some embodiments, the organic resin is disclosed in U.S. Pat. Nos. 6,413,697 or 6,413,697, which are incorporated by reference in their entireties.

In some embodiments, the organic resin is an aromatic di-functional acrylate. In some embodiments, the organic resin is bisphenol A polyethylene glycol diether diacrylate (KAYARAD® R-551), 2,2'-methylenebis[p-phenylenepoly (oxyethylene)oxy]diethyl diacrylate (KAYARAD® R-712), hydroquinone diacrylate, 4,4'-dihydroxybiphenyl diacrylate, bisphenol A diacrylate, bisphenol F diacrylate, bisphenol S diacrylate, ethoxylated or propoxylated bisphenol A diacrylate, ethoxylated or propoxylated bisphenol F diacrylate, ethoxylated or propoxylated bisphenol S diacrylate, or bisphenol-A epoxy diacrylate.

In some embodiments, the organic resin is a polyethylenglycol di-functional acrylate. In some embodiments, the organic resin is tetraethyleneglycol diacrylate (SARTOMER® 268), polyethyleneglycol (200) diacrylate (SARTOMER® 259), polyethyleneglycol (400) diacrylate (SARTOMER® 344).

In some embodiments, the organic resin is a tri-functional acrylate or an acrylate with even higher functionality. In some embodiments, the organic resin is hexane-2,4,6-triol triacrylate, glycerol triacrylate, 1,1,1-trimethylolpropane triacrylate, ethoxylated or propoxylated glycerol triacrylate, ethoxylated or propoxylated 1,1,1-trimethylolpropane triacrylate, pentaerythritol tetraacrylate, bistrimethylolpropane tetraacrylate, pentaerythritol monohydroxytriacrylate, dipentaerythritol monohydroxypentaacrylate, dipentaerythritol pentaacrylate (SARTOMER® 399), pentaerythritol triacrylate (SARTOMER® 444), pentaerythritol tetraacrylate (SARTOMER® 295), trimethylolpropane triacrylate (SARTOMER® 351), tris(2-acryloxy ethyl) isocyanurate triacrylate (SARTOMER® 368), ethoxylated trimethylolpropane triacrylate (SARTOMER® 454), or dipentaerythritol pentaacrylate ester (SARTOMER® 9041). In some embodiments, the organic resin is an aromatic triacrylate reaction product of triglycidyl ethers of trihydric phenols and phenol or cresol novolaks (phenol-formaldehdye condensation polymer) containing three hydroxyl groups, with acrylic acid.

In some embodiments, the organic resin is a polyfunctional urethane acrylate. Urethane acrylates may be prepared by, e.g., reacting a hydroxyl-terminated polyurethane with acrylic acid, or by reacting an isocyanate-terminated prepolymer with a hydroxyalkyl acrylate to give a urethane acrylate. In some embodiments, the organic resin is a urethane acrylate made from a polyester diol, an aliphatic isocyanate, or a hydroxyalkyl acrylate.

In some embodiments, the organic resin is a higher functionality acrylate, including hyberbranched polyester types. In some embodiments, the organic resin is a commercially available acrylate such as CN2301, CN2302, CN2303, CN2304 from SARTOMER®.

In some embodiments, the organic resin is a commercially available acrylate such as KAYARAD® D-310, D-330, DPHA-2H, DPHA-2C, DPHA-21, DPCA-20, DPCA-30, DPCA-60, DPCA-120, DN-0075, DN- 2475, T-2020, T-2040, TPA-320, TPA-330 T-1420, PET-30, THE-330, and RP-1040 from Nippon Kayaku Co., Ltd., Tokyo, Japan; R-526, R-604, R-011, R-300 and R-205 from Nippon Kayaku Co., Ltd., Tokyo, Japan; ARONIX® M-210, M-220, M-233, M-240, M-215, M-305, M-309, M-310, M-315, M-325, M-400, M-6200, and M-6400 from Toagosei Chemical Industry Co., Ltd., Tokyo, Japan; light acrylate BP-4EA, BP-4PA, BP-2EA, BP-2PA, and DCP-A from Kyoeisha Chemical Industry Co., Ltd., Osaka, Japan; New Frontier BPE-4, TEICA, BR-42M, and GX-8345 from Daichi Kogyo Seiyaku Co., Ltd., Tokyo, Japan; ASF-400 from Nippon Steel Chemical Co., Ltd., Tokyo, Japan; Ripoxy SP-1506, SP-1507, SP-1509, VR-77, SP-4010 and SP-4060 from Showa Highpolymer Co., Ltd., Tokyo, Japan; NK Ester A-BPE-4 from Shin-Nakamura Chemical Industry Co., Ltd., Wakayama, Japan; SA-1002 from Mitsubishi Chemical Co., Ltd., Tokyo, Japan; or Viscoat-195, Viscoat-230, Viscoat-260, Viscoat-310, Viscoat-214HP, Viscoat-295, Viscoat-300, Viscoat-360, Viscoat-GPT, Viscoat-400, Viscoat-700, Viscoat-540, Viscoat-3000, and Viscoat-3700 from Osaka Organic Chemical Industry Co., Ltd., Osaka, Japan.

In some embodiments, the organic resin is a methacrylate. In some embodiments, the organic resin is a single methacrylate compound or a mixture of different methacrylate compounds. In some embodiments, the organic resin is a methacrylate of mono-functional, di-functional, or of higher functionality.

In some embodiments, the organic resin is mono-functional acrylate. In some embodiments, the organic resin is isobornyl methacrylate, tetrahydrofurfuryl methacrylate, ethoxylated phenyl methacrylate, lauryl methacrylate, stearyl methacrylate, octyl methacrylate, isodecyl methacrylate, tridecyl methacrylate, caprolactone methacrylate, nonyl phenol methacrylate, cyclic trimethylolpropane formal methacrylate, methoxy polyethyleneglycol methacrylates, methoxy polypropyleneglycol methacrylates, hydroxyethyl methacrylate, hydroxypropyl methacrylate, or glycidyl methacrylate.

In some embodiments, the organic resin is an aliphatic or cycloaliphatic di-functional methacrylate such as 1,4-dihydroxymethylcyclohexane dimethacrylate, 2,2-bis(4-hydroxycyclohexyl)propane dimethacrylate, or bis(4-hydroxycyclohexyl)methane dimethacrylate.

In some embodiments, the organic resin is an acyclic aliphatic di-functional methacrylate disclosed in U.S. Pat. Nos. 6,413,697 or 6,413,697, which are herein incorporated by reference in their entireties.

In some embodiments, the organic resin is an aromatic di-functional methacrylate such as ethoxylated (2) bisphenol A dimethacrylate (SARTOMER® 10 IK), ethoxylated (2) bisphenol A dimethacrylate (SARTOMER® 348L), ethoxylated (3) bisphenol A dimethacrylate (SARTOMER® 348C), ethoxylated (4) bisphenol A dimethacrylate (SARTOMER® 150), ethoxylated (4) bisphenol A dimethacrylate (SARTOMER® 540), ethoxylated (10) bisphenol A dimethacrylate (SARTOMER® 480), hydroquinone dimethacrylate, 4,4'-dihydroxybiphenyl dimethacrylate, bisphenol A dimethacrylate, bisphenol F dimethacrylate, bisphenol S dimethacrylate, ethoxylated or propoxylated bisphenol A dimethacrylate, ethoxylated or propoxylated bisphenol F dimethacrylate, or ethoxylated or propoxylated bisphenol S dimethacrylate.

In some embodiments, the organic resin is a trifunctional methacrylate or a methacrylate with higher functionality such as tricyclodecane dimethanol dimethacrylate (SARTOMER® 834), trimethylolpropane trimethacrylate (SARTOMER® 350), tetramethylolmethane tetramethacrylate (SARTOMER® 367), hexane-2,4,6-triol trimethacrylate, glycerol trimethacrylate, 1,1,1-trimethylolpropane trimethacrylate, ethoxylated or propoxylated glycerol trimethacrylate, ethoxylated or propoxylated 1,1,1-trimethylolpropane trimethacrylate, pentaerythritol tetramethacrylate, bistrimethylolpropane tetramethacrylate, pentaerythritol monohydroxytrmethiacrylate, or dipentaerythritol monohydroxypentamethacrylate.

In some embodiments, the organic resin is an aromatic trifunctional methacrylate. In some embodiments, the aromatic trifunctional methacrylate is the reaction product of a triglycidyl ether of a trihydric phenol with phenol or cresol novolaks containing three hydroxyl groups, with methacrylic acid. In some embodiments, the aromatic trimethacrylate is the reaction product of a triglycidyl ether of a trihydric phenol with a phenol or cresol novolak containing three hydroxyl groups, with methacrylic acid.

In some embodiments, the organic resin is a polymethacrylate. A polymethacrylate may be a polyfunctional urethane methacrylate. Urethane methacrylates may be prepared by, e.g., reacting a hydroxyl-terminated polyurethane with methacrylic acid, or by reacting an isocyanate-terminated prepolymer with hydroxyalkyl methacrylates to give the urethane methacrylate. In some embodiments, the urethane methacrylates are made from polyester diols, aliphatic isocyanates and hydroxyalkyl methacrylates. In some embodiments, the polymethacrylate has polyfunctionality of methacrylates or mixed acrylic and methacrylic functionality.

In some embodiments, the organic resin is GENOMER® 4205, GENOMER® 4256, or GENOMER® 4297 (Rahn USA Corp., Aurora, Ill.).

Furthermore, higher functionality methacrylates, including hyberbranched polyester types, may also be used.

In some embodiments, the organic resin comprises an allyl ether. The allyl ether may contain one or more allyl ether groups, which typically are bonded to a core structural group which can be based on a wide variety of polyhydric alcohols. In some embodiments, the polyhydric alcohols include neopentyl glycol, trimethylolpropane, ethylene glycol, propylene glycol, butylene glycol, diethylene glycol, trimethylene glycol, methylene glycol, trimethylolethane, pentaerythritol, glycerol, diglycerol, 1,4-butanediol, 1,6-hexanediol, or 1,4-cyclohexanedimethanol. In some embodiments, the allyl ether is hydroxyethyl allyl ether, hydroxypropyl allyl ether, trimethylolpropane monoallyl ether, trimethylolpropane diallyl ether, triraethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, or 1,2,6-hexanetriol diallyl ether.

In some embodiments, the organic resin comprises an alkyne. In some embodiments, the alkyne is phenylacetylene, 1-hexyne, 1-octyne, 1-decyne, 1,5-hexadiyne, 1,7-octadiyne, 3,3-dimethyl-1-butyne, propargyl chloride, propargyl bromide, propargyl alcohol, 3-butyn-1-ol, 1-octyn-3-ol, methyl propargyl ether, propargyl ether, 3-methoxy-3-methyl-1-butyne, 2-methyl-3-butyn-2-ol, 1-ethynylcyclohexylamine, mono-propargylamine, 1-dimethylamino-2-propyne, tripropargylamine, 3-butyne-2-one, propiolic acid, 1-ethynyl-1-cyclohexanol, methyl propiolate, trimethylsilylacetylene, 2-pentyne, 4-octyne, 2-butyne-1,4-diol, 3-hexyne-2,5-diol, or 1-phenyl-1-butyne.

In some embodiments, the organic resin is a thiol-functional compound. In some embodiments, the thiol-functional compound is a mono-functional thiol, a multifunctional thiol, a thiol-ene, or a thiol-acrylate.

In some embodiments, the organic resin is a monofunctional or multifunctional thiol. A multifunctional thiol means a thiol with two or more thiol groups. A multifunctional thiol may be a mixture of different multifunctional thiols.

A multifunctional thiol component of the inventive compositions may be any compound having two or more thiol groups per molecule. In some embodiments, the organic resin is a multifunctional thiol described in U.S. Pat. No. 3,661,744 at Col. 8, line 76-Col. 9, line 46; in U.S. Pat. No. 4,119,617, Col. 7, lines 40-57; U.S. Pat. Nos. 3,445,419; and 4,289,867. In some embodiments, the multifunctional thiol is obtained by esterification of a polyol with an α- or β-mercaptocarboxylic acid such as thioglycolic acid or β-mercaptopropionic acid.

In some embodiments, the organic resin is pentaerythritol tetrakis(3-mercaptopropionate) (PTMP), pentaerythritol tetrakis(3-mercaptobutylate) (PETMB), trimethylolpropane tri-(3-mercaptopropionate) (TMPMP), glycol di-(3-mercaptopropionate) (GDMP), pentaerythritol tetramercaptoacetate (PETMA), trimethylolpropane trimercaptoacetate (TMPMA), glycol dimercaptoacetate (GDMA), ethoxylated trimethylpropane tri(3-mercaptopropionate) 700 (ETTMP 700), ethoxylated trimethylpropane tri(3-mercaptopropionate) 1300 (ETTMP 1300), propylene glycol 3-mercaptopropionate 800 (PPGMP 800), propylene glycol 3-mercaptopropionate 2200 (PPGMP 2200).

In some embodiments, the organic resin is a thiol-ene or a thiol-acrylate.

In some embodiments, the organic resin is an thiol-ene. Thiol-ene resins are formed by the addition of a R—SH across a double or triple bond by either a free radical or ionic mechanism.

In some embodiments, the thiol-ene is a composition comprising:
(a) at least one allyl ether, alkyne, or allylazine; and
(b) at least one thiol.

In some embodiments, the organic resin is a thiol-acrylate. In some embodiments, the thiol-acrylate resin is a composition comprising:
(a) at least one acrylate or methacrylate; and
(b) at least one thiol.

In some embodiments, the UV curable resin further comprises a photoinitiator. A photoinitiator initiates the curing reaction of the photosensitive material during exposure to light. In some embodiments, the photoinitiator is acetophenone-based, benzoin-based, or thioxathenone-based.

In some embodiments, the photoinitiator is MINS-311RM (Minuta Technology Co., Ltd, Korea).

In some embodiments, the photoinitiator is IRGACURE® 127, IRGACURE® 184, IRGACURE® 184D, IRGACURE® 2022, IRGACURE® 2100, IRGACURE® 250, IRGACURE® 270, IRGACURE® 2959, IRGACURE® 369, IRGACURE® 369 EG, IRGACURE® 379, IRGACURE® 500, IRGACURE® 651, IRGACURE® 754, IRGACURE® 784, IRGACURE® 819, IRGACURE® 819Dw, IRGACURE® 907, IRGACURE® 907 FF, IRGACURE® Oxe01, IRGACURE® TPO-L, IRGACURE® 1173, IRGACURE® 1173D, IRGACURE® 4265, IRGACURE® BP, or IRGACURE® MBF (BASF Corporation, Wyandotte, Mich.). In some embodiments, the photoinitiator is TPO-L (ethyl-(2,4,6-trimethylbenzoyl)phenyl phosphinate) or MBF (methyl benzoylformate).

In some embodiments, the weight percentage of the organic resin in the nanostructure composition is between about 5% and about 90%, about 5% and about 50%, about 5% and about 40%, about 5% and about 30%, about 5% and about 20%, about 5% and about 10%, about 10% and about 90%, about 10% and about 50%, about 10% and about 40%, about 10% and about 30%, about 10% and about 20%, about 20% and about 90%, about 20% and about 50%, about 20% and about 40%, about 20% and about 30%, about 30% and about 90%, about 30% and about 50%, about 30% and about 40%, about 40% and about 90%, about 40% and about 50%, or about 50% and about 90%.

In some embodiments, the weight percentage of the organic resin in the nanostructure molded article is between about 0.01% and about 90%, about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 90%, about 1% and about 50%, about 1% and about 25%, about 1% and about 20%, about 1% and about 15%, about 1% and about 10%, about 1% and about 5%, about 1% and about 2%, about 2% and about 90%, about 2% and about 50%, about 2% and about 25%, about 2% and about 20%, about 2% and about 15%, about 2% and about 10%, about 2% and about 5%, about 5% and about 90%, about 5% and about 50%, about 5% and about 25%, about 5% and about 20%, about 5% and about 15%, about 5% and about 10%, about 10% and about 90%, about 10% and about 50%, about 10% and about 25%, about 10% and about 20%, about 10% and about 15%, about 15% and about 90%, about 15% and about 50%, about 15% and about 25%, about 15% and about 20%, about 20% and about 90%, about 20% and about 50%, about 20% and about 25%, about 25% and about 50%, or about 50% and about 90%.

Michael Reaction

In some embodiments, the ligands on the nanostructures can undergo a Michael reaction with the organic resin. In some embodiments, the ligands on the nanostructure are soft nucleophiles and the soft nucleophiles on the nanostructure can undergo a Michael reaction with the organic resin. In some embodiments, the nanostructure can undergo a Michael reaction with the organic resin, wherein at least one organic resin comprises an acrylate, a methacrylate, or a thiol-functional compound.

Figure 6A:
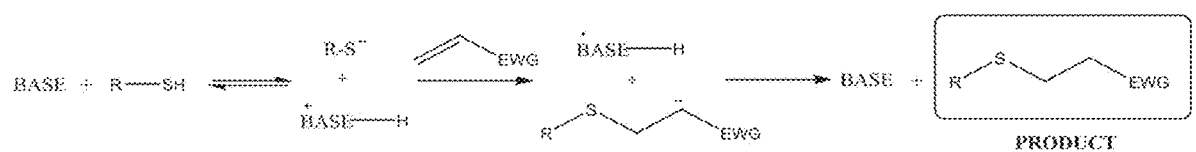
FIG. 6A is a schematic depicting the base-catalyzed Michael addition reaction.
Figure 6B:
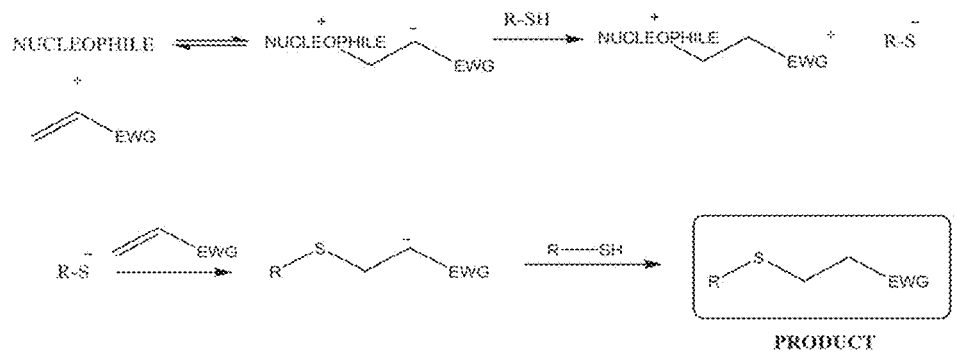
FIG. 6B is a schematic depicting the direct Michael addition.

An example of the Michael reaction is 1,4-addition or conjugate addition to an α,β-unsaturated carbonyl compound; however, there is a competition reaction: the 1,2-addition reaction. A schematic of the base-catalyzed Michael addition reaction is shown in FIG. 6A and a schematic of the direct Michael addition is shown in FIG. 6B. See Chatani, S., et al., "Relative reactivity and selectivity of vinyl sulfones and acrylates towards the thiol-Michael addition reaction and polymerization," *Polym. Chem.* 4:1048-1055 (2013).

Many optical resins of interest, such as acrylates, methacrylates, thiol-enes, and thiol-acrylates are vulnerable to uncontrollable polymerization and/or other side reactions in the presence of a base via base-catalyzed Michael addition or direct Michael addition. Thus, nanostructures which contain ligands that act as a base can only be added to resin systems vulnerable to base-catalyzed reactions immediately before processing into a film. In some embodiments, the ligand comprises a soft nucleophile functional group.

In some embodiments, in order to prevent reaction between nanostructure ligands comprising a soft nucleophile functional group and organic resins that can undergo a Michael reaction, a stabilization additive is added to the composition. In some embodiments, the stabilization additive is an acid or an ionic liquid.

Acid

In some embodiments, the stabilization additive is an acid. An acid can be used to prevent reaction between nanostructure ligands comprising a soft nucleophile functional group and organic resins that can undergo base-catalyzed Michael addition or direct Michael addition.

In some embodiments, the stabilization additive is an organic acid. In some embodiments, the stabilization additive is a carboxylic acid, a phosphinic acid, a phosphonic acid, a phosphate ester, a sulfinic acid, or a sulfonic acid.

In some embodiments, the stabilization additive is a carboxylic acid selected from the group consisting of formic acid, acetic acid, oxalic acid, glyoxylic acid, glycolic acid, propanoic acid, prop-2-enoic acid, 2-propynoic acid, propanedioic acid, 2-hydroxypropanedioic acid, oxopropanedioic acid, 2,2,-dihydropropanedioic acid, 2-oxopropanoic acid, 2-hydroxypropanoic acid, 3-hydroxypropanoic acid, 2-oxiranecarboxylic acid, butanoic acid, 2-methylpropanoic acid, butanedioic acid, 3-oxobutanoic acid, butenedioic acid, oxobutanedioic acid, hydroxybutanedioic acid, 2,3-dihydroxybutanedioic acid, but-2-enoic acid, pentanoic acid, 3-methylbutanoic acid, pentanedioic acid, 2-oxopentanedioic acid, methylenesuccinic acid (itaconic acid), hexanoic acid, hexanedioic acid, 2-hydroxypropane-1,2,3-tricarboxylic acid, prop-1-ene-1,2,3-tricarboxylic acid, 1-hydroxypropane-1,2,3-tricarboxylic acid, (2E,4E)-hexa-2,4-dienoic acid, phthalic acid, heptanoic acid, heptanedioic acid, cyclohexanecarboxylic acid, benzenecarboxylic acid, 2-hydroxybenzoic acid, octanoic acid, benzene-1,2-dicarboxylic acid, nonanoic acid, benzene-1,3,5-tricarboxylic acid, E-3-phenylprop-2-enoic acid, decanoic acid, decanedioic acid, undecanoic acid, dodecanoic acid, benzene-1,2,3,4,5,6-hexacarboxylic acid, tridecanoic acid, tetradecanoic acid, pentadecanoic acid, hexadecanoic acid, heptadecanoic acid, octadecanoic acid, (9Z)-octadec-9-enoic acid, (9Z,12Z)-octadeca-9,12-dienoic acid (linoleic acid), (9Z,12Z,15Z)-octadeca-9,12,15-trienoic acid, (6Z,9Z,12Z)-octadeca-6,9,12-trienoic acid, nonadecanoic acid, eicosanoic acid, heneicosanoic acid, tricosanoic acid, tetracosanoic acid, pentacosanoic acid, hexacosanoic acid, and mixtures thereof. In some embodiments, the acid is itaconic acid, phthalic acid, linoleic acid, or octanoic acid.

In some embodiments, the stabilization additive is a phosphinic acid. In some embodiments, the stabilization additive is dimethylphosphinic acid, phenylphosphinic acid, diphenylphosphinic acid (DPPA), bis(4-methoxyphenyl)phosphinic acid, diisooctylthiophosphinic acid, diisooctylphosphinic acid (DIOPA), or diisooctyldithiophosphinic acid. In some embodiments, the acid is diphenylphosphinic acid. In some embodiments, the acid is DIOPA.

In some embodiments, the stabilization additive is a phosphonic acid. In some embodiments, the phosphonic acid is methylphosphonic acid (aminomethyl)phosphonic acid, methylenediphosphonic acid, vinyl phosphonic acid, phosphonoacetic acid, ethylphosphonic acid, 2-aminoethylphosphonic acid, etidronic acid, iminodi(methylphosphonic acid), 3-phosphonopropionic acid, (3-bromopropyl)phosphonic acid, propylphosphonic acid, 3-aminopropylphosphonic acid, allylphosphonic acid, nitrilotri(methylphosphonic acid), nitrilotris(methylene)triphosphonic acid, N,N-bis(phosphomethyl)glycine, tert-butylphosphonic acid, N-(phosphonomethyl)iminodiacetic acid, 6-phosphonohexanoic acid, 3-bromobenzylphosphonic acid, 4-bromobenzylphosphonic acid, 4-aminobenzylphosphonic acid, octylphosphonic acid, 1,8-octanediphosphonic acid, diethylenetriaminepentakis(methylphosphonic acid), 1,10-decyldiphosphonic acid, hexadecylphosphonic acid, or combinations thereof.

In some embodiments, the stabilization additive is a phosphate ester. In some embodiments, the stabilization additive is a phosphate ester selected from the group consisting of bis(methacryloxyethyl)phosphate (BMOP), PPG-5-Ceteth-10 phosphate (e.g. Crodafos™ C10/5A, Croda Int'l Inc., Snaith, United Kingdom), Cetoleth-5 phosphate (e.g. Crodafos™ CO5A, Croda Int'l Inc., Snaith, United Kingdom), Deceth-4 phosphate (e.g. Crodafos™ D4A, Croda Int'l Inc., Snaith, United Kingdom), Glycereth-26 phosphate (e.g. Crodafos™ G26A, Croda Int'l Inc., Snaith, United Kingdom), Oleth-10 phosphate (e.g. Crodafos™ 010A, Croda Int'l Inc., Snaith, United Kingdom), DEA Oleth-10 phosphate (e.g. Crodafos™ 010D, Croda Int'l Inc., Snaith, United Kingdom), Oleth-3 phosphate (e.g. Crodafos™ 03A, Croda Int'l Inc., Snaith, United Kingdom), DEA Oleth-3 phosphate (e.g. Crodafos™ 03D, Croda Int'l Inc., Snaith, United Kingdom), Trideceth-10 phosphate (e.g. Crodafos™ T10A, Croda Int'l Inc., Snaith, United Kingdom), Trideceth-5 phosphate (e.g. Crodafos™ T5A, Croda Int'l Inc., Snaith, United Kingdom), and Trideceth-6 phosphate (e.g. Crodafos™ T6A, Croda Int'l Inc., Snaith, United Kingdom). In some embodiments, the stabilization additive is Deceth-4 phosphate. In some embodiments, the stabilization additive is BMOP.

In some embodiments, the stabilization additive is a sulfinic acid. In some embodiments, the sulfinic acid is formamideinesulfinic acid, hypotaurine, or combinations thereof.

In some embodiments, the stabilization additive is a sulfonic acid. In some embodiments, the stabilization additive is hydroxylamine-O-sulfonic acid, methylsulfamic acid, sulfoacetic acid, ethane sulfonic acid, 3-chloro-2-hydoxy-1-propanesulfonic acid, 1-propanesulfonic acid, 3-hydroxypropane-1-sulfonic acid, 1,3-propanedisulfonic acid, 3-amino-1-propanesulfonic acid, nonafluorobutane-1-sulfonic acid, 3-(amidinothio)-1-propanesulfonic acid, 2,4,5-trichlorobenzenesulfonic acid, 2,4-dinitrobenzenesulfonic acid hydrate, 4-bromobenzenesulfonic acid, 4-chlorobenzenesulfonic acid, 3-amino-4-hydroxy-5-nitrobenzenesulfonic acid, benzenesulfonic acid, 4-hydroxybenzene sulfonic acid, 3-aminobenzenesulfonic acid, aniline-2-sulfonic acid, sulfanilic acid, 3-amino-4-hydroxybenzenesulfonic acid, 2,4-diaminobenzenesulfonic acid, 2,5-diaminobenzenesulfonic acid, N-cyclohexylsulfamic acid, 5-sulfosalicylic acid, 4-aminotoluene-3-sulfonic acid, 3-amino-4-methoxybenzenesulfonic acid, 5-amino-2-methoxybenzenesulfonic acid, heptdecafluorooctanesulfonic acid, 3-(acetylamino)-4-hydroxy-5-nitrobenzenesulfonic acid, 3-(acetylamino)-5-amino-4-hydroxybenzenesulfonic acid, 4-ethylbenzensulfonic acid, p-xylene-2-sulfonic acid, ethyl 3-aminobenzoate methanesulfonate, 2-mesitylenesulfonic acid, 1-naphthalenesulfonic acid, 2-naphthalenesulfonic acid, 2-amino-1-naphthalenesulfonic acid, 4-amino-1-naphthalenesulfonic acid, 5-amino-1-naphthalenesulfonic acid, 5-amino-2-naphthalenesulfonic acid, 6-amino-1-naphthalenesulfonic acid, 8-amino-2-napthalenesulfonic acid, 4-amino-3-hydroxy-1-naphthalenesulfonic acid, 6-amino-4-hydroxy-2-naphthalenesulfonic acid, 7-amino-4-hydroxy-2-naphthalenesulfonic acid, 1-amino-1,3-naphthalenesulfonic acid, 4-amino-5-hydroxynaphtalenesulfonic acid, 8-(2-aminoethylamino)-1-naphthalenesulfonic acid, bromamine acid, 5-benzoyl-4-hydroxy-2-methoxybenzenesulfonic acid, 4,4'-diamino-2,2'-stilbenedisulfonic acid, 1-pyrenesulfonic acid, 3-(allylphenyl-sulfamoyl)-benzoic acid, 2-(diphenylphosphino)benzenesulfonic acid, or combinations thereof.

In some embodiments, the stabilization additive is lauric acid, hexanoic acid, oleic acid, trifluoromethanesulfonic acid, octyl phosphonic acid, 2-ethylhexanoic acid, myristic acid, decanoic acid, palmitic acid, stearic acid, linoleic acid, or combinations thereof.

In some embodiments, the stabilization additive is DPPA, itaconic acid, phthalic acid, linoleic acid, octanoic acid, deceth-4 phosphate, DIOPA, or BMOP.

In some embodiments, the stabilization additive is itaconic acid, DPPA, DIOPA, BMOP, or deceth-4 phosphate.

In some embodiments, the concentration of the acid used is between 0.1 M and 5 M, between 0.1 M and 4 M, between 0.1 M and 3 M, between 0.1 M and 2 M, between 0.1 M and 2 M, between 0.5 M and 5 M, between 0.5 M and 4 M, between 0.5 M and 3 M, between 0.5 M and 2 M, between 0.5 M and 1 M, between 1 M and 5 M, between 1 M and 4 M, between 1 M and 3 M, between 1 M and 2 M, between 2 M and 5 M, between 2 M and 4 M, between 2 M and 3 M, between 3 M and 5 M, between 3 M and 4 M, or between 4 M and 5 M.

In some embodiments, the molar ratio of the nanostructures to the acid is between about 1:1 and about 1:1000. In some embodiments, the molar ratio of the nanostructures to the acid is between about 1:1 and about 1:1000, between about 1:1 to about 1:500, between about 1:1 to about 1:250, between about 1:1 to about 1:100, between about 1:1 to about 1:50, between about 1:2 to about 1:1000, between about 1:2 to about 1:500, between about 1:2 to about 1:250, between about 1:2 to about 1:100, between about 1:2 to about 1:50, between about 1:5 and about 1:1000, between about 1:5 to about 1:500, between about 1:5 to about 1:250, between about 1:5 to about 1:100, between about 1:5 to about 1:50, between about 1:10 to about 1:1000, between about 1:10 to about 1:500, between about 1:10 to about 1:250, between about 1:10 to about 1:100, or between about 1:10 to about 1:50. In some embodiments, the molar ratio of the nanostructures to the acid is between about 1:5 and about 1:20.

In some embodiments, the weight percentage of the acid in the nanostructure composition is between about 0.05% and about 10%, about 0.05% and about 8%, about 0.05% and about 6%, about 0.05% and about 4%, about 0.05% and about 2%, about 0.05% and about 1%, about 1% and about 10%, about 1% and about 8%, about 1% and about 6%, about 1% and about 4%, about 1% and about 2%, about 2% and about 10%, about 2% and about 8%, about 2% and about 6%, about 2% and about 4%, about 4% and about 10%, about 4% and about 8%, about 4% and about 6%, about 6% and about 10%, about 6% and about 8%, or about 8% and about 10%. In some embodiments, the weight percentage of the acid in the nanostructure composition is between about 0.05% and about 10%.

Ionic Liquid

In some embodiments, the stabilization additive is an ionic liquid. An ionic liquid can be used to prevent reaction between quantum dot ligands comprising a soft nucleophile functional group and organic resins that can undergo base-catalyzed Michael addition or direct Michael addition.

In some embodiments, the stabilization additive is a room temperature ionic liquid. In some embodiments, the ionic liquid comprises the cation imidazolium, pyrrolidinum, pyridininum, phosphonium, ammonium, or sulfonium. In some embodiments, the ionic liquid comprises the anion alkyl sulfate, tosylate, methanesulfonate, bis(trifluoromethylsulfonyl)imide (TFSI), tetrafluorophosphate ($BF_4$), hexafluorophosphate ($PF_6$), halide, triflate (TF), [fluoro(nonafluorobutane) sulfonyl]imide (FNF), chlorate ($ClO_4$), or sulfate ($SO_4$).

In some embodiments, the stabilization additive is an imidazolium salt. In some embodiments, the stabilization additive is selected from the group consisting of 1-ethyl-3-methylimidazolium chloride, 1-ethyl-3-methylimidazolium bromide, 1-ethyl-3-methylimidazolium iodide, 1-ethyl-3-methylimidazolium hexafluorophosphate, 1-ethyl-3-methylimidazolium tetrafluoroborate, 1-ethyl-3-methylimidazolium dicyanamide, 1-ethyl-3-methylimidazolium ethyl sulfate, 1-ethyl-3-methylimidazolium hydrogen sulfate, 1-ethyl-3-methylimidazolium trifluoro(trifluoromethyl)borate, 1-ethyl-3-methylimidazolium trifluoromethane sulfonate, 1-ethyl-3-methylimidazolium methane sulfonate, 1-butyl-3-methylimidazolium chloride, 1,3-dimethylimidazolium chloride dimethyl phosphate, 1-butyl-3-methylimidazolium bromide, 1-butyl-3-methylimidazolium chloride 1-butyl-3-methylimidazolium tetrafluoroborate, 1-butyl-3-methylimidazolium hexafluorophosphate, 1-butyl-3-methylimidazolium trifluoromethanesulfonate, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-3-methylimidazolium tetrachloroferrate, 1-butyl-3-methylimidazolium iodide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1-butyl-3-methylimidazolium thiocyanate, 1-butyl-2,3-dimethylimidazolium trifluoromethanesulfonate, 1,3-dimethylimidazolium dimethyl phosphate, 1,3-dimethylimidazolium chloride, 1,2-dimethyl-3-propylimidazolium iodide, 2,3-dimethyl-1-propylimidazolium bis(trifluoromethanesulfonyl)imide, 1-decyl-3-methylimidazolium bis(trifluoromethanesulfonyl)imide, 1,3-dimethylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium trifluoromethanesulfonate, 1-hexyl-3-methylimidazolium bromide, 1-hexyl-2,3-dimethylimidazolium iodide, 1-hexyl-3-methylimidazolium bis(trifluoromethanesulfonyl)imide, 1-(2-hydroxyethyl)-3-methylimidazolium tetrafluoroborate, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-n-octylimidazolium trifluoromethanesulfonate, and 1-methyl-3-n-octylimidazolium tetrafluoroborate.

In some embodiments, the stabilization additive is a pyrrolidinium salt. In some embodiments, the stabilization additive is a pyrrolidinium salt selected from the group consisting of 1-butyl-1-methylpyrrolidinium bis(trifluoromethanesulfonyl)imide, 1-butyl-1-methylpyrrolidinium chloride, 1-butyl-1-methylpyrrolidinium bromide, 1-ethyl-1-methylpyrrolidinium tetrafluoroborate, 1-ethyl-1-methylpyrrolidinium bromide, and 1-methyl-1-propylpyrrolidinium bis(trifluoromethanesulfonyl)imide.

In some embodiments, the stabilization additive is a piperidinium salt. In some embodiments, the stabilization additive is selected from the group consisting of 1-butyl-1-methylpiperidinium bromide, 1-butyl-1-methylpiperidinium bis(trifluoromethanesulfonyl)imide, and 1-methyl-1-propylpiperidinium bromide.

In some embodiments, the stabilization additive is a pyridinium salt. In some embodiments, the stabilization additive is selected from the group consisting of 1-butylpyridinium chloride, 1-butylpyridinium bromide, 1-butylpyridinium hexafluorophosphate, 1-butyl-4-methylpyridinium bromide, 1-butyl-4-methylpyridinium hexafluorophosphate, 1-butyl-3-methylpyridinium bromide, 1-butylpyridinium tetrafluoroborate, 1-butyl-3-methylpyridinium chloride, 1-butyl-4-methylpyridinium chloride, 1-ethylpyridinium bromide, 1-ethylpyridinium chloride, 1-ethyl-3-methylpyridinium ethyl sulfate, 1-ethyl-3-(hydroxymethyl)pyridinium ethyl sulfate, 1-ethyl-3-methylpyridinium bis(trifluoromethanesulfonyl)imide, 1-hexylpyridinium hexafluorophosphate, and 1-propylpyridinium chloride.

In some embodiments, the stabilization additive is a morpholinium salt. In some embodiments, the stabilization additive is 4-ethyl-4-methylmorpholinium bromide.

In some embodiments, the stabilization additive is an ammonium salt. In some embodiments, the stabilization additive is selected from the group consisting of amyltriethylammonium bis(trifluoromethanesulfonyl)imide, cyclohexyltrimethylammonium bis(trifluoromethanesulfonyl)imide, methyltri-n-octylammonium bis(trifluoromethanesulfonyl)imide, tetrabutylammonium bromide, tetrabutylammonium chloride, tetrabutylammonium iodide, tetrabutylammonium tetrafluoroborate, tetrahexylammonium iodide, tetraamylammonium iodide, tetra-n-octylammonium iodide, tetrabutylammonium hexafluorophosphate, tetraheptylammonium iodide, tetraamylammonium bromide, tetraamylammonium chloride, tetrabutylammonium trifluoromethanesulfonate, tetrahexylammonium bromide, tetraheptylammonium bromide, tetra-n-octylammonium bromide, tetrapropylammonium chloride, tributylmethylammonium bis(trifluoromethanesulfonyl)imide, tetrabutylammonium acetate, and trimethylpropylammonium bis(trifluoromethanesulfonyl)imide.

In some embodiments, the stabilization additive is a phosphonium salt. In some embodiments, the stabilization additive is selected from the group consisting of tributylhexadecylphosphonium bromide, tributylmethylphosphonium iodide, tributyl-n-octylphosphonium bromide, tetrabutylphosphonium bromide, tetra-n-octylphosphonium bromide, tetrabutylphosphonium tetrafluoroborate, tetrabutylphosphonium hexafluorophosphate, tributyl(2-methoxyethyl)phosphonium bis(trifluoromethanesulfonyl)imide, and tributylmethylphosphonium bis(trifluoromethanesulfonyl)imide.

In some embodiments, the stabilization additive is a sulfonium salt. In some embodiments, the stabilization additive is selected from the group consisting of trimethylsulfonium iodide, tributylsulfonium iodide, and triethylsulfonium bis(trifluoromethanesulfonyl)imide.

In some embodiments, the molar ratio of the nanostructures to the ionic liquid is between about 1:1 and about 1:1000. In some embodiments, the molar ratio of the nanostructures to the ionic liquid is between about 1:1 and about 1:1000, between about 1:1 to about 1:500, between about 1:1 to about 1:250, between about 1:1 to about 1:100, between about 1:1 to about 1:50, between about 1:2 to about 1:1000, between about 1:2 to about 1:500, between about 1:2 to about 1:250, between about 1:2 to about 1:100, between about 1:2 to about 1:50, between about 1:5 and about 1:1000, between about 1:5 to about 1:500, between about 1:5 to about 1:250, between about 1:5 to about 1:100, between about 1:5 to about 1:50, between about 1:10 to about 1:1000, between about 1:10 to about 1:500, between about 1:10 to about 1:250, between about 1:10 to about 1:100, or between about 1:10 to about 1:50. In some embodiments, the molar ratio of the nanostructures to the ionic liquid is between about 1:5 and about 1:20.

In some embodiments, the weight percentage of the acid in the nanostructure composition is between about 0.05% and about 10%, about 0.05% and about 8%, about 0.05% and about 6%, about 0.05% and about 4%, about 0.05% and about 2%, about 0.05% and about 1%, about 1% and about 10%, about 1% and about 8%, about 1% and about 6%, about 1% and about 4%, about 1% and about 2%, about 2% and about 10%, about 2% and about 8%, about 2% and about 6%, about 2% and about 4%, about 4% and about 10%, about 4% and about 8%, about 4% and about 6%, about 6% and about 10%, about 6% and about 8%, or about 8% and about 10%. In some embodiments, the weight percentage of the acid in the nanostructure composition is between about 0.05% and about 10%.

Making the Nanostructure Compositions

The present invention provides a method of making a nanostructure composition comprising admixing at least one population of nanostructures, at least one stabilization additive, and at least one organic resin.

The present invention provides a method of preparing a nanostructure composition comprising:
(a) providing a composition comprising at least one population of nanostructures and at least one stabilization additive; and
(b) admixing at least one organic resin with the composition of (a).

In some embodiments, at least one population of nanostructures comprise a ligand comprising an amine, a thiol, a cyano, or combinations thereof. In some embodiments, at least one organic resin is an acrylate, a methacrylate, or a thiol-functional compound.

In some embodiments, if more than one population of nanostructures is used, the first population of nanostructures is admixed with the second population of nanostructures followed by admixing with the at least one stabilization additive.

In some embodiments, the first population of nanostructures and the second population of nanostructures are admixed with at least one stabilization additive at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the first population of nanostructures and the second population of nanostructures are admixed with at least one stabilization additive for a time of between about 1 minute and about 24 hours, about 1 minute and about 20 hours, about 1 minute and about 15 hours, about 1 minute and about 10 hours, about 1 minute and about 5 hours, about 1 minute and about 1 hour, about 1 minute and about 30 minutes, about 1 minute and about 10 minutes, about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before admixing the first population of nanostructures and the second population of nanostructures with the stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture before admixing the first population of nanostructures and the second population of nanostructures with the stabilization additive is between about 23° C. and about 50° C.

In some embodiments, the temperature of the reaction mixture after admixing the first population of nanostructures and the second population of nanostructures with the stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture after admixing the first population of nanostructures and the second population of nanostructures with the stabilization additive is between about 23° C. and about 50° C.

In some embodiments, if more than one population of nanostructures is used, the first population of nanostructures is admixed with a first stabilization additive and is added to the second population of nanostructures admixed with a second stabilization additive. In some embodiments, the first and second stabilization additives are the same. In some embodiments, the first and second stabilization additives are different.

In some embodiments, the first population of nanostructures in a stabilization additive is admixed with the second population of nanostructures in a stabilization additive at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the first population of nanostructures in a stabilization additive is admixed with the second population of nanostructures in a stabilization additive for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before admixing the first population of nanostructures in a stabilization additive and the second population of nanostructures in a stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture before admixing the first population of nanostructures in a stabilization additive and the second population of nanostructures in a stabilization additive is between about 23° C. and about 50° C.

In some embodiments, the temperature of the reaction mixture after admixing the first population of nanostructures in a stabilization additive and the second population of nanostructures in a stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture after admixing the first population of nanostructures in a stabilization additive and the second population of nanostructures in a stabilization additive is between about 23° C. and about 50° C.

In some embodiments, if more than one organic resin is used, the organic resins are added together and mixed. In some embodiments, a first organic resin is mixed with a second organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the mixture further comprises at least one solvent.

In some embodiments, a first organic resin is mixed with a second organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the at least one population of nanostructures with at least one stabilization additive is admixed with at least one organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the mixture further comprises at least one solvent.

In some embodiments, the at least one population of nanostructures with at least one stabilization additive is admixed with at least one organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before the at least one population of nanostructures with at least one stabilization additive is admixed with at least one organic resin is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture before the at least one population of nanostructures with at least one stabilization additive is admixed with at least one organic resin is between about 23° C. and about 50° C.

In some embodiments, the temperature of the reaction mixture after the at least one population of nanostructures with at least one stabilization additive is admixed with at least one organic resin is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture after the at least one population of nanostructures with at least one stabilization additive is admixed with at least one organic resin is between about 23° C. and about 50° C.

The stability of a nanostructure composition can be determined by measuring the viscosity after admixing the at least one population of nanostructure, at least one stabilization additive, and at least one organic resin. Viscosity can be measured using a cone and plate Brookfield viscometer. A nanostructure structure composition is stable if the viscosity does not increase more than 40%.

In some embodiments, a nanostructure composition comprising at least one population of nanostructures, at least one stabilization additive, and at least one organic resin has a viscosity increase of less than 40% at about 1 hour, about 5 hours, about 10 hours, about 24 hours, about 5 days, about 10 days, about 20 days, about 1 year, or about 3 years after admixing.

In some embodiments, a nanostructure composition comprising at least one population of nanostructures, at least one stabilization additive, and at least one organic resin has a viscosity increase of less than 20% at about 1 hour, about 5 hours, about 10 hours, about 24 hours, about 5 days, about 10 days, about 20 days, about 1 year, or about 3 years after admixing.

The present invention provides a method of preparing a nanostructure composition comprising:
(a) providing a composition comprising at least one organic resin and at least one stabilization additive; and
(b) admixing at least one population of nanostructures with the composition of (a).

In some embodiments, at least one population of nanostructures comprise a ligand comprising an amine, a thiol, a cyano, or combinations thereof. In some embodiments, at least one organic resin comprises an acrylate, a methacrylate, or a thiol-functional compound.

In some embodiments, if more than one organic resin is used, the at least one first organic resin is admixed with the at least one second organic resin.

In some embodiments, the first organic resin and the second organic resin are admixed with at least one stabilization additive at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the first organic resin and the second organic resin are admixed with at least one stabilization additive for a time of between about 1 minute and about 24 hours, about 1 minute and about 20 hours, about 1 minute and about 15 hours, about 1 minute and about 10 hours, about 1 minute and about 5 hours, about 1 minute and about 1 hour, about 1 minute and about 30 minutes, about 1 minute and about 10 minutes, about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before the first organic resin and the second organic resin are admixed with at least one stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture before the first organic resin and the second organic resin are admixed with at least one stabilization additive is between about 23° C. and about 50° C.

In some embodiments, the temperature of the reaction mixture after the first organic resin and the second organic resin are admixed with at least one stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture after the first organic resin and the second organic resin are admixed with at least one stabilization additive is between about 23° C. and about 50° C.

In some embodiments, if more than one organic resin is used, the first organic resin is admixed with the first stabilization additive and is added to the second organic resin admixed with the second stabilization additive. In some embodiments, the first and second stabilization additives are the same. In some embodiments, the first and second stabilization additives are different.

In some embodiments, the first organic resin in the first stabilization additive is admixed with the second organic resin in the second stabilization additive at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the first organic resin in the first stabilization additive is admixed with the second organic resin in the second stabilization additive for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before the first organic resin in the first stabilization additive is admixed with the second organic resin in the second stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture before the first organic resin in the first stabilization additive is admixed with the second organic resin in the second stabilization additive is between about 23° C. and about 50° C.

In some embodiments, the temperature of the reaction mixture after the first organic resin in the first stabilization additive is admixed with the second organic resin in the second stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture after the first organic resin in the first stabilization additive is admixed with the second organic resin in the second stabilization additive is between about 23° C. and about 50° C.

In some embodiments, at least organic resin in at least one stabilization additive is admixed with at least one population of nanostructures at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, at least one organic resin in at least one stabilization additive is admixed with at least one population of nanostructures for a time of between about 1 minute and about 24 hours, about 1 minute and about 20 hours, about 1 minute and about 15 hours, about 1 minute and about 10 hours, about 1 minute and about 5 hours, about 1 minute and about 1 hour, about 1 minute and about 30 minutes, about 1 minute and about 10 minutes, about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before admixing at least one organic resin in at least one stabilization additive with at least one population of nanostructures is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture before admixing at least one organic resin in at least one stabilization additive with at least one population of nanostructures is between about 23° C. and about 50° C.

In some embodiments, the temperature of the reaction mixture after admixing at least one organic resin in at least one stabilization additive with the at least one population of nanostructures is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture after admixing at least one organic resin in at least one stabilization additive with the at least one population of nanostructures is between about 23° C. and about 50° C.

In some embodiments, a nanostructure composition comprising at least one population of nanostructures, at least one stabilization additive, and at least one organic resin has a viscosity increase of less than 40% at about 1 hour, about 5 hours, about 10 hours, about 24 hours, about 5 days, about 10 days, about 20 days, about 1 year, or about 3 years after admixing.

In some embodiments, a nanostructure composition comprising at least one population of nanostructures, at least one stabilization additive, and at least one organic resin has a viscosity increase of less than 20% at about 1 hour, about 5 hours, about 10 hours, about 24 hours, about 5 days, about 10 days, about 20 days, about 1 year, or about 3 years after admixing.

The present invention provides a method of preparing a nanostructure composition comprising:
(a) providing a composition comprising at least one population of nanostructures and at least one organic resin; and
(b) admixing at least one stabilization additive with the composition of (a).

In some embodiments, at least one population of nanostructures comprise a ligand comprising an amine, a thiol, a cyano, or combinations thereof. In some embodiments, at least one organic resin comprises an acrylate, a methacrylate, or a thiol-functional compound.

In some embodiments, at least one population of nanostructures is admixed with at least one organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, at least one population of nanostructures is admixed with at least one resin for a time of between about 1 minute and about 24 hours, about 1 minute and about 20 hours, about 1 minute and about 15 hours, about 1 minute and about 10 hours, about 1 minute and about 5 hours, about 1 minute and about 1 hour, about 1 minute and about 30 minutes, about 1 minute and about 10 minutes, about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before admixing at least one population of nanostructures and at least one organic resin is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture before admixing at least one population of nanostructures and at least one organic resin is between about 23° C. and about 50° C.

In some embodiments, the temperature of the reaction mixture after admixing at least one population of nanostructures and at least one organic resin is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and about 200° C. In some embodiments, the temperature of the reaction mixture after admixing at least one population of nanostructures and at least one organic resin is between about 23° C. and about 50° C.

In some embodiments, at least one population of nanostructures and at least one organic resin is admixed with at least one stabilization additive at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm. In some embodiments, the mixture further comprises at least one solvent.

In some embodiments, at least one population of nanostructures and at least one organic resin is admixed with at least one stabilization additive for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the temperature of the reaction mixture before at least one population of nanostructures and at least one organic resin is admixed with at least one stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture before at least one population of nanostructures and at least one organic resin is admixed with at least one stabilization additive is between about 23° C. and about 50° C.

In some embodiments, the temperature of the reaction mixture after at least one population of nanostructures and at least one organic resin is admixed with at least one stabilization additive is between about 0° C. and about 200° C., about 0° C. and about 150° C., about 0° C. and about 100° C., about 0° C. and about 50° C., about 0° C. and about 23° C., about 23° C. and about 200° C., about 23° C. and about 150° C., about 23° C. and about 100° C., about 23° C. and about 50° C., about 50° C. and about 200° C., about 50° C. and about 150° C., about 50° C. and about 100° C., about 100° C. and about 200° C., about 100° C. and about 150° C., or about 150° C. and 200° C. In some embodiments, the temperature of the reaction mixture after the at least one population of nanostructures and the at least one organic resin is admixed with at least one stabilization additive is between about 23° C. and about 50° C.

In some embodiments, a nanostructure composition comprising at least one population of nanostructures, at least one stabilization additive, and at least one organic resin has a viscosity increase of less than 40% at about 1 hour, about 5 hours, about 10 hours, about 24 hours, about 5 days, about 10 days, about 20 days, about 1 year, or about 3 years after admixing.

In some embodiments, a nanostructure composition comprising at least one population of nanostructures, at least one stabilization additive, and at least one organic resin has a viscosity increase of less than 20% at about 1 hour, about 5 hours, about 10 hours, about 24 hours, about 5 days, about 10 days, about 20 days, about 1 year, or about 3 years after admixing.

Making a Nanostructure Layer

The nanostructures used in the present invention can be embedded in a polymeric matrix using any suitable method. As used herein, the term "embedded" is used to indicate that the quantum dot population is enclosed or encased with the polymer that makes up the majority of the component of the matrix. The some embodiments, the at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the quantum dot composition is cured after deposition. Suitable curing methods include photo-curing, such as UV curing, and thermal curing. Traditional laminate film processing methods, tape-coating methods, and/or roll-to-roll fabrication methods can be employed in forming the quantum dot films of the present invention. The quantum dot composition can be coated directly onto the desired layer of a substrate. Alternatively, the quantum dot composition can be formed into a solid layer as an independent element and subsequently applied to the substrate. In some embodiments, the nanostructure composition can be deposited on one or more barrier layers.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains on the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the quantum dot composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the compositions are thermally cured to form the nanostructure layer. In some embodiments, the compositions are cured using UV light. In some embodiments, the quantum dot composition is coated directly onto a barrier layer of a quantum dot film, and an additional barrier layer is subsequently deposited upon the quantum dot layer to create the quantum dot film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a quantum dot layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum film white point), as well as the nanostructure film thickness and other characteristics. Additionally, these embodiments will allow for periodic testing of the quantum dot film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Barrier Layers

In some embodiments, the quantum dot molded article comprises one or more barrier layers disposed on either one or both sides of the quantum dot layer. Suitable barrier layers protect the quantum dot layer and the quantum dot molded article from environmental conditions such as high temperatures, oxygen, and moisture. Suitable barrier materials include non-yellowing, transparent optical materials which are hydrophobic, chemically and mechanically compatible with the quantum dot molded article, exhibit photo- and chemical-stability, and can withstand high temperatures. Preferably, the one or more barrier layers are index-matched to the quantum dot molded article. In preferred embodiments, the matrix material of the quantum dot molded article and the one or more adjacent barrier layers are index-matched to have similar refractive indices, such that most of the light transmitting through the barrier layer toward the quantum dot molded article is transmitted from the barrier layer into the quantum dot layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the quantum dot layer is disposed on at least a first barrier layer, and at least a second barrier layer is disposed on the quantum dot layer on a side opposite the quantum dot layer to form the quantum dot molded article according to one embodiment of the present invention. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the quantum dot molded article comprises at least 2 layers comprising different materials or compositions, such that the multi-layered barrier eliminates or reduces pinhole defect alignment in the barrier layer, providing an effective barrier to oxygen and moisture penetration into the quantum dot layer. The quantum dot layer can include any suitable material or combination of materials and any suitable number of barrier layers on either or both sides of the quantum dot layer. The materials, thickness, and number of barrier layers will depend on the particular application, and will suitably be chosen to maximize barrier protection and brightness of the quantum dot layer while minimizing thickness of the quantum dot molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the quantum dots comprise heavy metals or other toxic materials, which guidelines may require more or thicker barrier layers. Additional considerations for the barriers include cost, availability, and mechanical strength.

In some embodiments, the quantum dot film comprises two or more barrier layers adjacent each side of the quantum dot layer, for example, two or three layers on each side or two barrier layers on each side of the quantum dot layer. In some embodiments, each barrier layer comprises a thin glass sheet, e.g., glass sheets having a thickness of about 100 μm, 100 μm or less, or 50 μm or less.

Each barrier layer of the quantum dot film of the present invention can have any suitable thickness, which will depend on the particular requirements and characteristics of the lighting device and application, as well as the individual film components such as the barrier layers and the quantum dot layer, as will be understood by persons of ordinary skill in the art. In some embodiments, each barrier layer can have a thickness of 50 μm or less, 40 μm or less, 30 μm or less, 25 μm or less, 20 μm or less, or 15 μm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10

µm or less, 5 µm or less, 1 µm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Quantum Dot Film Features and Embodiments

In some embodiments, the quantum dot films of the present invention are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Preparation of Green Quantum Dot Concentrate in IBOA

The composition of the green quantum dot concentrate (by weight):
Green quantum dots: ~1-2%
Carboxylic acid polyethylene oxide/polypropylene oxide ligand: ~15-20%
4-Hydroxy-TEMPO: 200 ppm of the entire concentrate
Isobornyl acrylate (IBOA): remainder of concentrate The green quantum dots comprise carboxylic acid polyethylene oxide/polypropylene oxide ligands bound to the quantum dots. The green quantum dot concentrate in IBOA was prepared through solvent exchange with a green quantum dot concentrate in toluene. The IBOA contained 200 ppm of 4-hydroxy-TEMPO. The ratio (volume) of toluene exchanged for IBOA was ~1:1. Quantum dots in toluene were exchanged for IBOA using vacuum distillation at room temperature (down to ~50 mTorr) in which the toluene was trapped in a condensing flask.

Figure 4:
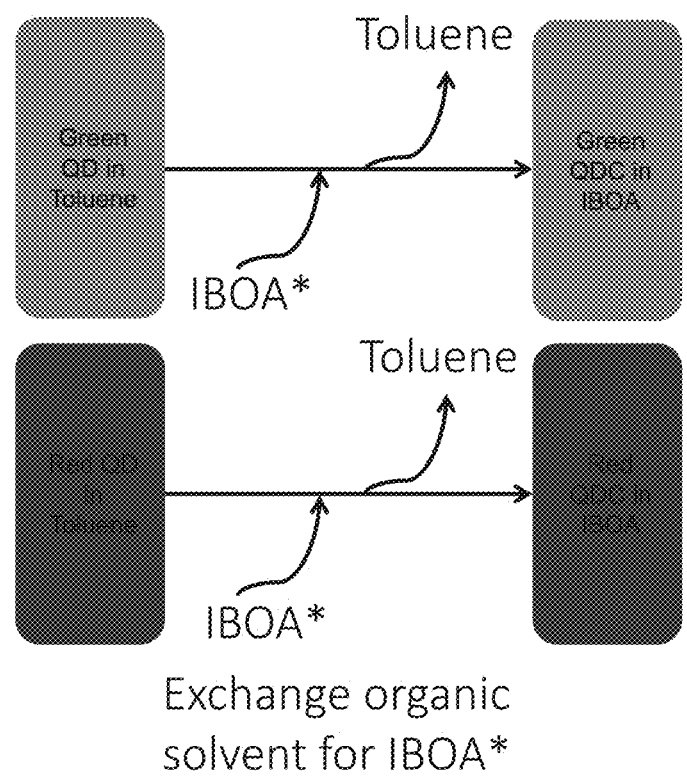
FIG. 4 is a schematic depicting the exchange of organic solvent in red and green quantum dot concentrates in Examples 1 and 2. In the schematic, toluene is exchanged for isobornyl acrylate (IBOA) containing 200 ppm 4-hydroxy-TEMPO.
Figure 5:
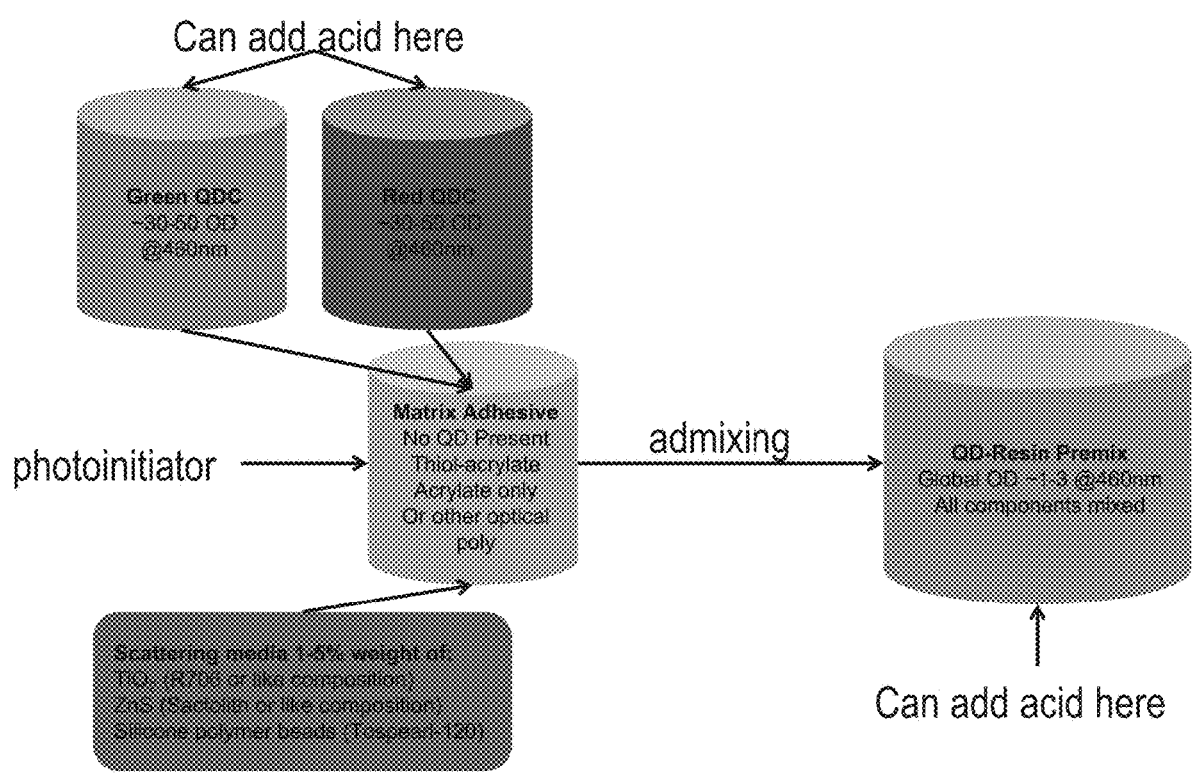
FIG. 5 is a schematic depicting the admixing steps for preparing the quantum dot-resin premix. In one embodiment, a stabilization additive can be added to the quantum dot concentrate before admixing with an organic resin. In another embodiment, a stabilization additive can be added to the quantum dot-resin premix.

The red quantum dot concentration in the quantum dot concentrate was determined by optical density (OD) measurement. OD was measured at 460 nm using a 1 cm path length cuvette. The OD range for quantum dots in toluene is between 10-200 OD. The OD range desired for the quantum dot concentrate in IBOA is between 30-50 OD. A schematic of the quantum dot exchange for a green quantum dot concentrate is shown in FIG. 4.

Example 2

Preparation of Red Quantum Dot Concentrate in IBOA

The composition of the red quantum dot concentrate (by weight):
Red quantum dots: ~1-2%
Carboxylic acid polyethylene oxide/polypropylene oxide ligand: ~15-20%
4-Hydroxy-TEMPO: 200 ppm of the entire concentrate
Isobornyl acrylate (IBOA): remainder of concentrate The red quantum dots comprise carboxylic acid polyethylene oxide/polypropylene oxide ligands bound to the quantum dots. The red quantum dot concentrate in IBOA was prepared through solvent exchange with a red quantum dot concentrate in toluene. The IBOA contained 200 ppm of 4-hydroxy-TEMPO. The ratio (volume) of toluene exchanged for IBOA was ~1:1. Quantum dots in toluene were exchanged for IBOA using vacuum distillation at room temperature (down to ~50 mTorr) in which the toluene was trapped in a condensing flask.

The red quantum dot concentration in the quantum dot concentrate was determined by optical density (OD) measurement. OD was measured at 460 nm using a 1 cm path length cuvette. The OD range for quantum dots in toluene is between 10-200 OD. The OD range desired for the quantum dot concentrate in IBOA is between 30-50 OD. A schematic of the quantum dot exchange for a red quantum dot concentrate is shown in FIG. 4.

Example 3

Preparation of Quantum Dot-Resin Pre-Mix with a Stabilization Additive Added to the Concentrates The composition (weight percentage) of the green quantum dot-resin pre-mix:
Green quantum dot concentrate (optical density: ~30-50): <1%
Red quantum dot concentrate (optical density: ~30-50): <0.5%
Ethyl-(2,4,6-Trimethylbenzoyl)phenyl phosphinate (TPO-L): 1%
Carboxylic acid polyethylene oxide/polypropylene ligand: 1.5%
Pentaerythritol tetrakis (3-mercaptopropionate) (PTMP): 18%
Tricyclodecane dimethanol diacrylate (TCDD): 73%
Isobornyl acrylate: 6%
$TiO_2$ (Ti-Pure® R706, DuPont, Wilmington, Del.): 0.35%

To <1% (by weight) of the green quantum dot concentrate (prepared in Example 1) was added a stabilization additive. To <0.5% (by weight) of the red quantum dot concentrate (prepared in Example 2) was added a stabilization additive. The green quantum dot concentrate and the red quantum dot concentrate were mixed. To the mixture was added 18% (by weight) of PTMP, 73% (by weight) of TCDD, and 1% (by weight) of TPO-L. The mixture was mixed in a planetary vacuum mixer. 0.35% (by weight) of $TiO_2$ was added followed by mixing in a planetary vacuum mixer. The resulting quantum dot-resin pre-mix had an optical density of ~1-3 (measured at 460 nm in a 1 cm path length cuvette).

Example 4

Viscosity Measurements of Pre-Mix with a Stabilization Additive Added to the Concentrates The viscosity of pre-mix compositions prepared using the procedure in Example 3 was measured using a cone and plate Brookfield viscometer (Brookfield Engineering, Middleboro, Mass.). A stabilization additive (1% of the weight of the pre-mix composition) was added to the quantum dot concentrates before mixing with the resin to produce the pre-mix compositions. Results of the measurements are shown in FIG. 1.

Samples:
Sample A: Quantum Dot-Resin Pre-Mix with addition of diphenylphosphinic acid (DPPA) measured for 150 hours at room temperature
Sample B: Quantum Dot-Resin Pre-Mix with addition of itaconic acid measured for 150 hours at room temperature
Sample C: Quantum Dot-Resin Pre-Mix with addition of phthalic acid measured for 150 hours at room temperature
Sample D: Quantum Dot-Resin Pre-Mix with addition of linoleic acid measured for 150 hours at room temperature
Sample E: Quantum Dot-Resin Pre-Mix with addition of octanoic acid measured for 150 hours at room temperature
Sample F: Quantum Dot-Resin Pre-Mix with addition of Deceth-4 phosphate (Crodafos D4A) measured for 150 hours at room temperature
Sample G: Quantum Dot-Resin Pre-Mix with addition of diisooctylphosphinic acid (DIOPA) measured for 150 hours at room temperature
Sample H: Quantum Dot-Resin Pre-Mix with no stabilization additive added Interaction of excess or unbound ligands in the quantum dot concentrate with the resin via a Michael reaction is shown by an increase in the viscosity of the pre-mix composition after mixing. As shown in FIG. 1, the control pre-mix composition in which no stabilization additive was added underwent a dramatic increase in viscosity within 25 hours after mixing the quantum dot concentrate and the resin. And, as shown in FIG. 1, stabilization additives such as itaconic acid, DPPA, and Deceth-4 phosphate were able to prevent the reaction of the excess or unbound ligands with the resin. As shown in FIG. 1, more acidic, higher functional weight, more soluble stabilization additives performed the best.

Example 5

Preparation of Quantum Dot-Resin Pre-Mix with a Stabilization Additive Added to the Resin The composition (weight percentage) of the green quantum dot pre-mix:
Green quantum dot concentrate (optical density: ~30-50): <1%
Red quantum dot concentrate (optical density: ~30-50): <0.5%
Ethyl-(2,4,6-Trimethylbenzoyl)phenyl phosphinate (TPO-L): 1%
Carboxylic acid polyethylene oxide/polyethylene propylene ligand: 1.5%
Pentaerythritol tetrakis (3-mercaptopropionate) (PTMP): 18%
Tricyclodecane dimethanol diacrylate (TCDD): 73%
Isobornyl acrylate (IBOA): 6%
$TiO_2$ (Ti-Pure® R706, DuPont, Wilmington, Del.): 0.35%

To a mixture of 18% (by weight) of PTMP, 73% (by weight) of TCDD, 1% (by weight) of TPO-L, and 0.35% (by weight) of $TiO_2$ was added a stabilization additive with mixing using a planetary vacuum mixer. To the mixture was added <1% (by weight) of the green quantum dot concentrate (prepared in Example 1) and <0.5% (by weight) of the red quantum dot concentrate (prepared in Example 2). The resulting mixture was mixed using a planetary vacuum mixture. The resulting quantum dot-resin pre-mix had an optical density of ~1-3 (measured at 460 nm in a 1 cm path length cuvette).

Example 6

Figure 2:
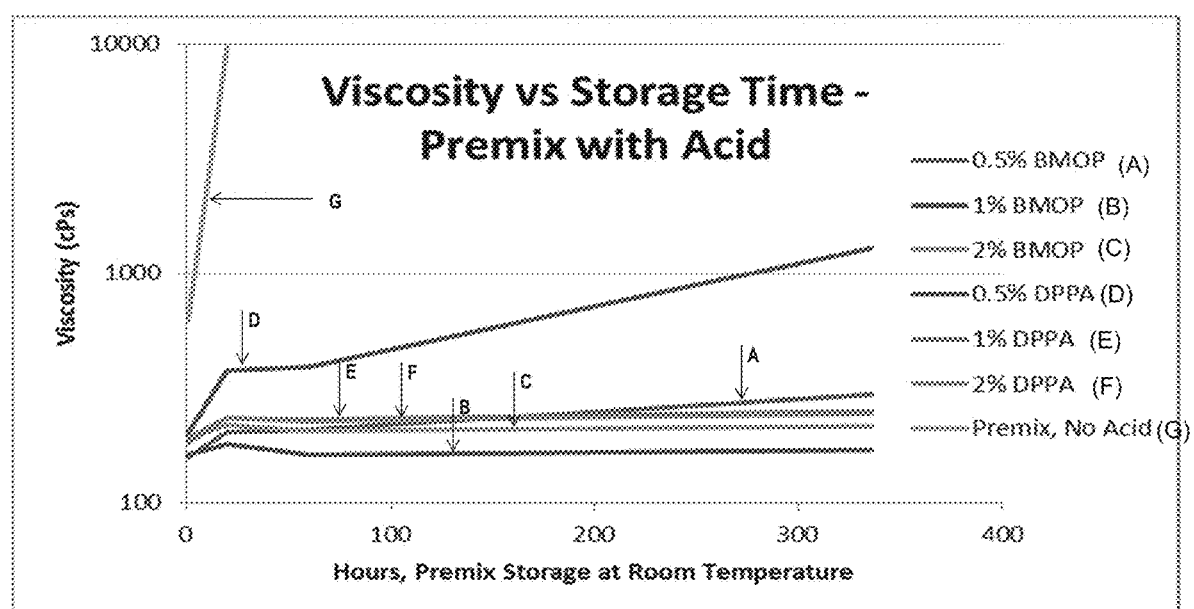
FIG. 2 is a graph showing viscosity versus storage time for (A) premix with 0.5% (w/w) bis(methacryloxyethyl) phosphate (BMOP); (B) premix with 1% (w/w) BMOP; (C) premix with 2% (w/w) BMOP; (D) premix with 0.5% (w/w) DPPA; (E) premix with 1% (w/w) DPPA; (F) premix with 2% (w/w) DPPA; and (G) premix with no acid.

Viscosity Measurements of Pre-Mix with a Stabilization Additive Added to the Resin The viscosity of pre-mix compositions prepared using the procedure in Example 5 was measured using a cone and plate Brookfield viscometer (Brookfield Engineering, Middleboro, Mass.). A stabilization additive (by weight of the pre-mix composition) was added to the resin before mixing with the quantum dot concentrates to produce the pre-mix compositions. Results of the measurements are shown in FIG. 2.

Samples:
Sample A: Quantum Dot-Resin Pre-Mix with addition of 0.5% bis(methacryloxyethyl) phosphate (BMOP) measured for 350 hours at room temperature
Sample B: Quantum Dot-Resin Pre-Mix with addition of 1% BMOP measured for 350 hours at room temperature
Sample C: Quantum Dot-Resin Pre-Mix with addition of 2% BMOP measured for 350 hours at room temperature
Sample D: Quantum Dot-Resin Pre-Mix with addition of 0.5% DPPA measured for 350 hours at room temperature
Sample E: Quantum Dot-Resin Pre-Mix with addition of 1% DPPA measured for 350 hours at room temperature
Sample F: Quantum Dot-Resin Pre-Mix with addition of 2% DPPA measured for 350 hours at room temperature
Sample G: Quantum Dot-Resin Pre-Mix with no stabilization additive added As shown in FIG. 1, the control pre-mix composition in which no stabilization additive was added to the resin underwent a dramatic increase in viscosity within 25 hours after mixing the quantum dot concentrate and the resin. The stabilization additive BMOP was shown in FIG. 2 to provide the greatest stabilization effect, with 1% BMOP showing a greater stabilization effect than 0.5% or 2% BMOP. Similarly, 1% and 2% DPPA showed a greater stabilization effect than 0.5% DPPA in FIG. 2.

Example 7

Preparation of Quantum Dot-Resin Pre-Mix with a Stabilization Additive Added to the Pre-Mix The composition (weight percentage) of the green quantum dot pre-mix:
Green quantum dot concentrate (optical density: ~30-50): <1%

Red quantum dot concentrate (optical density: ~30-50): <0.5%
Ethyl-(2,4,6-Trimethylbenzoyl)phenyl phosphinate (TPO-L): 1%
Carboxylic acid polyethylene oxide/polyethylene propylene ligand: 1.5%
Pentaerythritol tetrakis (3-mercaptopropionate) (PTMP): 18%
Tricyclodecane dimethanol diacrylate (TCDD): 73%
Isobornyl acrylate: 6%
$TiO_2$ (Ti-Pure® R706, DuPont, Wilmington, Del.): 0.35%

To a mixture of 18% (by weight) of PTMP, 73% (by weight) of TCDD, 1% (by weight) of TPO-L, and 0.35% (by weight) of $TiO_2$ was added <1% (by weight) of the green quantum dot concentrate (prepared in Example 1) and <0.5% (by weight) of the red quantum dot concentrate (prepared in Example 2). The resulting mixture was mixed using a planetary vacuum mixture. To the mixture was added a stabilization additive. The resulting quantum dot-resin pre-mix had an optical density of ~1-3 (measured at 460 nm in a 1 cm path length cuvette).

Example 8

Figure 3:
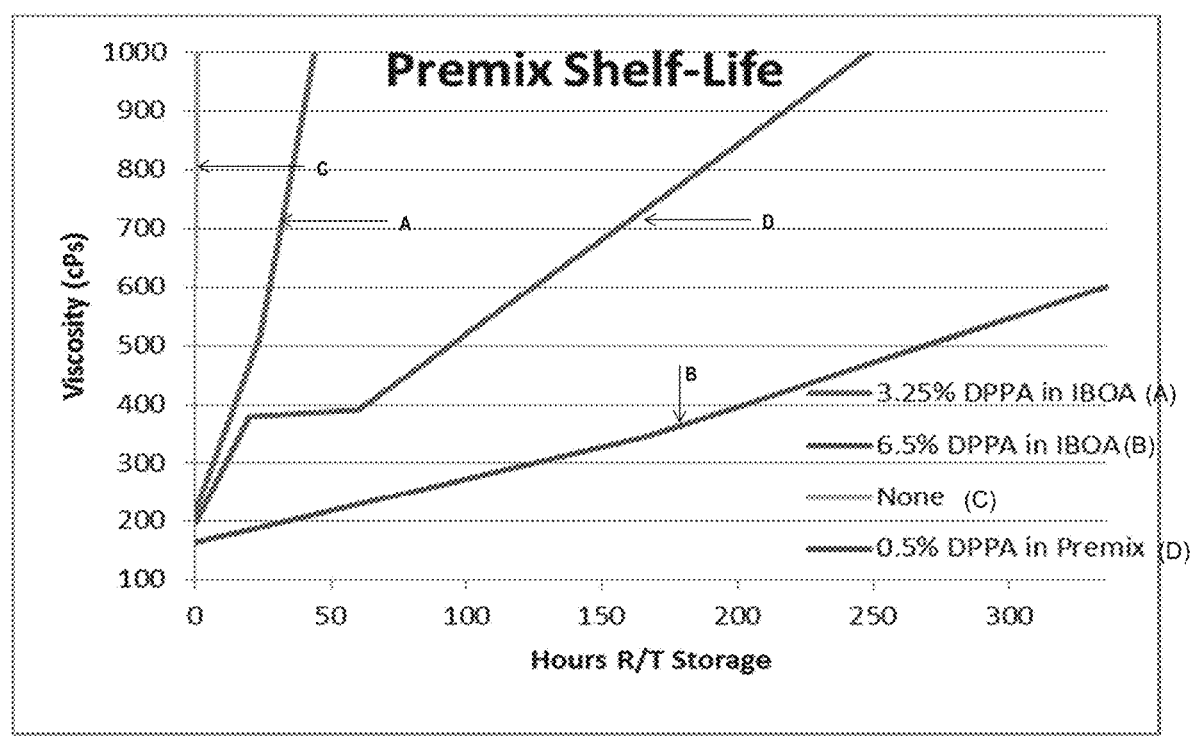
FIG. 3 is a graph showing viscosity versus storage time for quantum dot resin acid concentrates formulated with (A) 3.25% (w/w) DPPA in isobornyl acrylate (IBOA); (B) 6.5% (w/w) DPPA in IBOA; (C) no acid (control); and (D) 0.5% DPPA in premix. 0.5% weight DPPA in premix is an equivalent amount of acid as 6.5% DPPA in a quantum dot concentrate used to formulate the same optical density (OD) quantum dot enhancement film (QDEF).

Viscosity Measurements of Pre-Mix with a Stabilization Additive Added to the Quantum Dot Concentrate Compared to Addition to the Pre-mix The viscosity of pre-mix compositions was measured using a cone and plate Brookfield viscometer (Brookfield Engineering, Middleboro, Mass.). For samples C and D, a stabilization additive (by weight of the pre-mix composition) was added to the pre-mix compositions after mixing of the quantum dot concentrate and the resin (using the procedure in Example 7). For samples A and B, a stabilization additive (by weight of the quantum dot concentrate) was added to the quantum dot concentrate before mixing with the resin (using the procedure of Example 3). Results of the measurements are shown in FIG. 3. 0.5% weight of DPPA in the pre-mix composition (Samples C and D) is an equivalent amount of acid as 6.5% DPPA in the quantum dot concentrate used to formulate the pre-mix composition (Samples A and B).

Samples:
Sample A: Quantum Dot-Resin Pre-Mix with addition of 3.25% DPPA in IBOA measured for 350 hours at room temperature
Sample B: Quantum Dot-Resin Pre-Mix with addition of 6.5% DPPA in IBOA measured for 350 hours at room temperature
Sample C: Quantum Dot-Resin Pre-Mix with no stabilization additive added measured for 350 hours at room temperature
Sample D: Quantum Dot-Resin Pre-Mix with addition of 0.5% DPPA measured for 350 hours at room temperature As shown in FIG. 3, addition of the stabilization additive to the quantum dot concentrate before mixing with the resin provided the greatest stability. Sample D shows that a pre-mix in which the stabilization additive was added directed to the pre-mix was much less stable than addition of the stabilization additive to the quantum dot concentrate before mixing with resin to produce the pre-mix composition (Sample C).

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure composition, comprising:
   (a) at least one population of nanostructures, wherein between about 20 and about 100 mole percent of ligands in at least one population of nanostructures comprise a ligand comprising an amine, a thiol, or a cyano functional group;
   (b) at least one organic resin, wherein at least one organic resin is an acrylate, a methacrylate, or a thiol-functional compound; and
   (c) at least one stabilization additive comprising itaconic acid, diphenylphosphinic acid, diisooctylphosphinic acid, bis(methacryloxyethyl)phosphate, or deceth-4 phosphate;
   wherein the nanostructure composition is stable for at least 1 hour.

2. The nanostructure composition of claim 1, wherein the at least one population of nanostructures comprises a core selected from the group consisting of InP, InZnP, InGaP, CdSe, CdS, CdSSe, CdZnSe, CdZnS, ZnSe, ZnSSe, InAs, InGaAs, and InAsP.

3. The nanostructure composition of claim 1, comprising between one and five organic resins.

4. The nanostructure composition of claim 1, wherein at least one organic resin is a thiol-functional compound.

5. The nanostructure composition of claim 1, wherein at least one organic resin is an acrylate.

6. The nanostructure composition of claim 1, wherein at least one organic resin is selected from the group consisting of pentaerythritol tetrakis(3-mercaptopropionate), pentaerythritol tetrakis(3-mercaptobutylate), trimethylolpropane tri-(3-mercaptopropionate), glycol di-(3-mercaptopropionate), pentaerythritol tetramercaptoacetate, trimethylolpropane trimercaptoacetate, glycol dimercaptoacetate, ethoxylated trimethylpropane tri(3-mercaptopropionate) 700, ethoxylated trimethylpropane tri(3-mercaptopropionate) 1300, propylene glycol 3-mercaptopropionate 800, and propylene glycol 3-mercaptopropionate 2200.

7. The nanostructure composition of claim 1, wherein at least one organic resin is selected from the group consisting of isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, and glycidyl acrylate.

8. The nanostructure composition of claim 1, wherein at least one organic resin is selected from the group consisting of tricyclodecane dimethanol diacrylate, dioxane glycerol diacrylate, 1,6-hexanediol diacrylate, 3-methyl 1,5-pentanediol diacrylate, tripropylene glycol diacrylate, neopentyl glycol diacrylate, dimethyloltricyclodecane diacrylate, 1,4- dihydroxymethylcyclohexane diacrylate, 2,2-bis(4-hydroxycyclohexyl)propane diacrylate, and bis(4-hydroxycyclohexyl)methane diacrylate.

9. The nanostructure composition of claim 1, comprising two organic resins, wherein one organic resin is pentaerythritol tetrakis(3-mercaptopropionate) and one organic resin is tricyclodecane dimethanol diacrylate.

10. The nanostructure composition of claim 1, further comprising a photoinitiator, wherein the photoinitiator is ethyl-(2,4,6-trimethylbenzoyl)phenyl phosphinate.

11. The nanostructure composition of claim 1, wherein the composition is stable for at least 24 hours.

12. The nanostructure composition of claim 1, wherein the nanostructure composition comprises two populations of nanostructures and three organic resins, wherein two organic resins are acrylates and one organic resin is a thiol-functional compound.

13. A method of preparing a nanostructure composition, the method comprising:
(a) (i) providing a composition comprising at least one population of nanostructures and at least one stabilization additive, wherein between about 20 and about 100 mole percent of ligands in at least one population of nanostructures comprise a ligand comprising an amine, a thiol, or a cyano functional group; and
   (ii) admixing at least one organic resin with the composition of (a)(i), wherein at least one organic resin comprises an acrylate, a methacrylate, or a thiol-functional compound; or
(b) (i) providing a composition comprising at least one organic resin and at least one stabilization additive, wherein at least one organic resin comprises an acrylate, a methacrylate, or a thiol-functional compound; and
   (ii) admixing at least one population of nanostructures with the composition of (b)(i), wherein between about 20 and about 100 mole percent of ligands in at least one population of nanostructures comprise a ligand comprising an amine, a thiol, or a cyano functional group; or
(c) (i) providing a composition comprising at least one population of nanostructures and at least one organic resin, wherein between about 20 and about 100 mole percent of ligands in at least one population of nanostructures comprise a ligand comprising an amine, a thiol, or a cyano functional group, and wherein at least one organic resin comprises an acrylate, a methacrylate, or a thiol-functional compound; and
   (ii) admixing at least one stabilization additive with the composition of (c)(i) wherein the at least one stabilization additive comprises itaconic acid, diphenylphosphinic acid, diisooctylphosphinic acid, bis(methacryloxyethyl)phosphate, or deceth-4 phosphate.

14. The method of claim 13, comprising between one and five stabilization additives.

15. The method of claim 13, wherein the nanostructure composition has a viscosity increase of less than 40% at 1 hour after the admixing in (a)(ii), (b)(ii), or (c)(ii).

16. The method of claim 13, wherein the nanostructure composition has a viscosity increase of less than 40% at 24 hours after the admixing in (a)(ii), (b)(ii), or (c)(ii).

17. The method of claim 13, comprising two organic resins.

18. The method of claim 13, comprising two populations of nanostructures, three organic resins, and one stabilization additive.

19. A nanostructure film layer comprising:
(a) at least one population of nanostructures, wherein between about 20 and about 100 mole percent of ligands in at least one population of nanostructures comprise a ligand comprising an amine, a thiol, or a cyano functional group;
(b) at least one organic resin, wherein at least one organic resin is an acrylate, a methacrylate, or a thiol-functional compound; and
(c) at least one stabilization additive comprising itaconic acid, diphenylphosphinic acid, diisooctylphosphinic acid, bis(methacryloxyethyl)phosphate, or deceth-4 phosphate;
wherein the nanostructure film layer is stable for at least 1 hour.

20. The nanostructure film layer of claim 19, comprising between one and five organic resins.

21. The nanostructure film layer of claim 19, wherein at least one organic resin is a thiol-functional compound.

22. The nanostructure film layer of claim 19, wherein at least one organic resin is an acrylate.

23. The nanostructure film layer of claim 19, comprising two organic resins, wherein one organic resin is pentaerythritol tetrakis(3-mercaptopropionate) and one organic resin is tricyclodecane dimethanol diacrylate.

24. The nanostructure film layer of claim 19, wherein the nanostructure film layer is stable for at least 24 hours.

25. The nanostructure film layer of claim 19, wherein the nanostructure film layer comprises two populations of nanostructure and three organic resins, wherein two organic resins are acrylates and one organic resin is a thiol-functional compound.

26. The nanostructure composition of claim 1, wherein the at least one stabilization additive is diphenylphosphinic acid.

27. The nanostructure composition of claim 1, wherein the at least one stabilization additive is bis(methacryloxyethyl)phosphate.

28. The method of claim 13, wherein the at least one stabilization additive is diphenylphosphinic acid.

29. The method of claim 13, wherein the at least one stabilization additive is bis(methacryloxyethyl)phosphate.

30. The nanostructure film layer of claim 19, wherein the at least one stabilization additive is diphenylphosphinic acid.

31. The nanostructure film layer of claim 19, wherein the at least one stabilization additive is bis(methacryloxyethyl)phosphate.

* * * * *